United States Patent
Imanaka

(10) Patent No.: US 8,422,772 B2
(45) Date of Patent: Apr. 16, 2013

(54) DECODING DEVICE, DECODING METHOD, AND RECEIVING DEVICE

(75) Inventor: Takaaki Imanaka, Osaka (JP)

(73) Assignee: Panasonic Corporation, Osaka (JP)

(*) Notice: Subject to any disclaimer, the term of this patent is extended or adjusted under 35 U.S.C. 154(b) by 504 days.

(21) Appl. No.: 12/682,364

(22) PCT Filed: Jun. 4, 2009

(86) PCT No.: PCT/JP2009/002517
§ 371 (c)(1),
(2), (4) Date: Apr. 9, 2010

(87) PCT Pub. No.: WO2009/150801
PCT Pub. Date: Dec. 17, 2009

(65) Prior Publication Data
US 2010/0215263 A1 Aug. 26, 2010

(30) Foreign Application Priority Data
Jun. 10, 2008 (JP) .................. 2008-151244

(51) Int. Cl.
*G06K 9/00* (2006.01)
(52) U.S. Cl.
USPC ........... 382/162; 382/164; 382/166; 382/167; 382/274; 382/232
(58) Field of Classification Search .................. 382/162, 382/164, 167, 274; 348/453, 396.1, 395.1, 348/402.1, 403.1, 401.1; 358/538; 345/593, 345/597
See application file for complete search history.

(56) References Cited

U.S. PATENT DOCUMENTS

| | | | | |
|---|---|---|---|---|
| 5,412,428 A | * | 5/1995 | Tahara | 375/240.25 |
| 5,515,077 A | * | 5/1996 | Tateyama | 345/593 |
| 6,088,062 A | | 7/2000 | Kanou et al. | |

(Continued)

FOREIGN PATENT DOCUMENTS

| JP | 10-056641 | | 2/1998 |
|---|---|---|---|
| JP | 10056641 A | * | 2/1998 |

(Continued)

OTHER PUBLICATIONS

International Search Report issued Jul. 14, 2009 in corresponding International Application No. PCT/JP2009/002517.

(Continued)

*Primary Examiner* — Ali Bayat
(74) *Attorney, Agent, or Firm* — Wenderoth, Lind & Ponack, L.L.P.

(57) ABSTRACT

A decoding device decodes coded image data having a plurality of color components and includes a variable length decoding unit that performs variable length decoding on the coded image data to generate variable length decoded data. A separation unit separates the plurality of color components to a predetermined number of color components, and obtains, from the variable length decoded data generated by the variable length decoding unit, each of pieces of data to be decoded in decoding processes, as necessary data required in at least one of decoding processes, and the decoding processes each corresponding to a corresponding component of the predetermined number of color components. Each of the image reconstruction units corresponds to a corresponding component of the predetermined number of color components, and generates, in parallel, decoded images regarding the respective components using the necessary data obtained by the separation unit.

12 Claims, 21 Drawing Sheets

U.S. PATENT DOCUMENTS

| | | | |
|---|---|---|---|
| 6,188,727 B1* | 2/2001 | Lee | 375/240.03 |
| 6,542,162 B1* | 4/2003 | Hrusecky et al. | 345/629 |
| 2003/0123555 A1* | 7/2003 | Kim | 375/240.25 |

FOREIGN PATENT DOCUMENTS

| | | |
|---|---|---|
| JP | 10-164584 | 6/1998 |
| JP | 10-191392 | 7/1998 |
| JP | 2003-032679 | 1/2003 |
| JP | 2004-056400 | 2/2004 |
| JP | 2005-260639 | 9/2005 |

OTHER PUBLICATIONS

Recommendation ITU-T H.262 (1995 E) ISO/IEC 13818-2:1995(E) pp. i-xi, 1-243.

International Standard ISO/IEC 14496-10, Information Technology-Coding of audio-visual objects—, Part 10: Advanced Video Coding, Second edition, Oct. 1, 2004, pp. i-xi, 1-267.

International Search Report issued Jul. 21, 2009 in corresponding International Application No. PCT/JP2009/002517.

Abstract and full English machine translation of previously cited JP 10-056641 dated Feb. 24, 1998.

Abstract and full English machine translation of previously cited JP 2004-056400 dated Feb. 19, 2004.

Abstract and full English machine translation of previously cited JP 2003-032679 dated Jan. 31, 2003.

* cited by examiner

FIG. 13

X Pixels of Luminance
O Pixels of Chrominance

FIG. 14

X Pixels of Luminance
O Pixels of Chrominance

X  Pixels of Luminance
O  Pixels of Chrominance

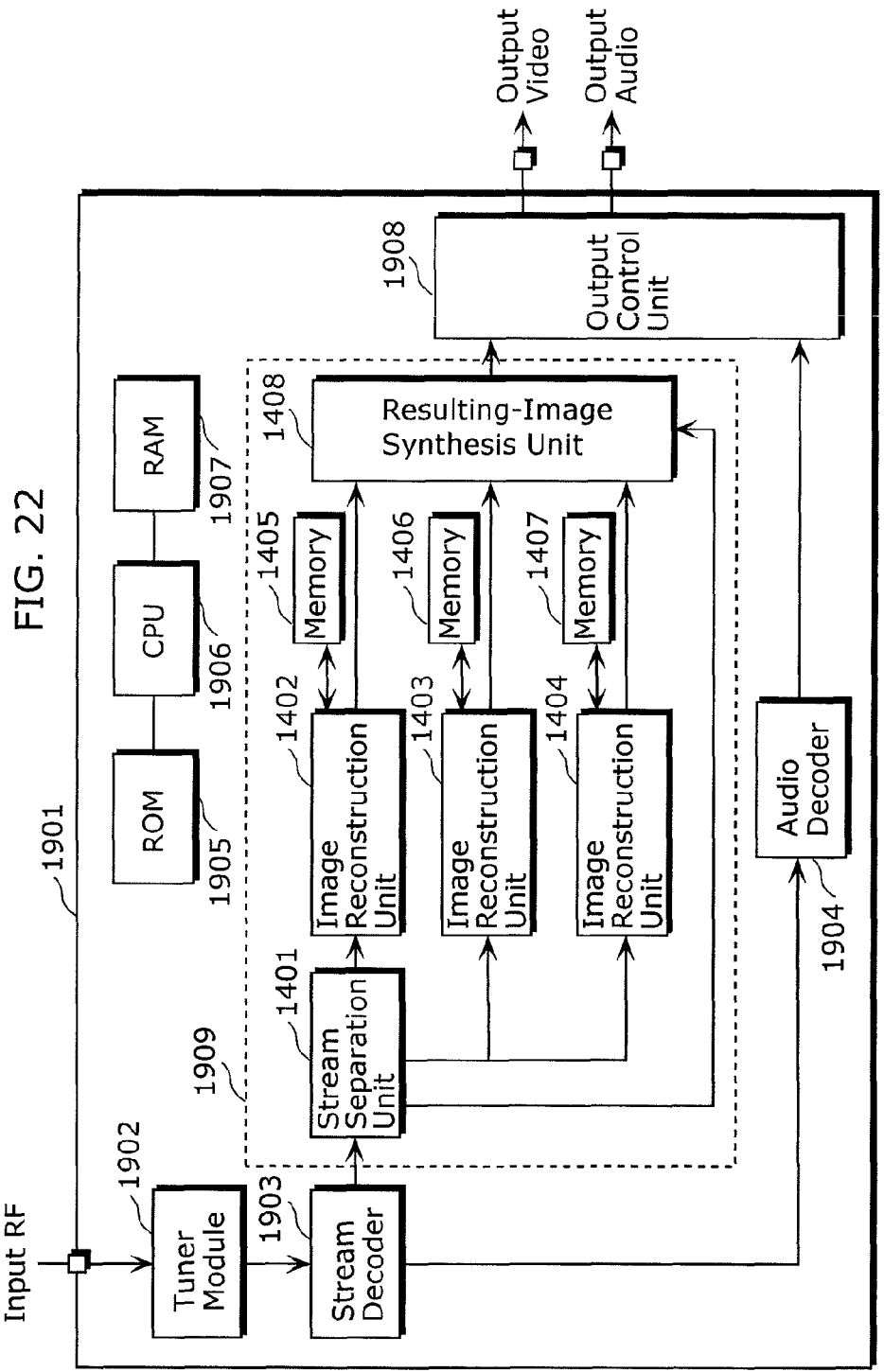

DECODING DEVICE, DECODING METHOD, AND RECEIVING DEVICE

BACKGROUND OF THE INVENTION

1. Technical Field

The present invention relates to decoding devices, decoding methods, and receiving devices concerning compressed image, and more particularly to a decoding device, a decoding method, and a receiving device for each of which a high data processing capability is required.

2. Background Art

Conventionally, among technologies of performing video coding (hereinafter, referred to simply as "coding") using a difference between pictures, there is a Moving Picture Expert Group (MPEG) coding technology. For example, a MPEG-2 standard (see Non-Patent Reference 1) and an H.264 standard (see Non-Patent Reference 2) are widely used in the fields of broadcasting technologies and accumulation technologies such as optical discs.

The standards such as digital television broadcasting currently utilized in many countries and Blu-ray Discs, have a chrominance format of 4:2:0 and an image size of 1920×1080 pixels.

On the other hand, aiming at higher image quality, future expansion of the standards has been discussed. More specifically, a chrominance format of 4:2:2 or 4:4:4, or an image size of 3840×2160 pixels would be adopted.

Such expansion of standards expansion dramatically increases a calculation amount required for decoding. Eventually, in the current technological abilities, a cost of developing a single decoder chip is high due to factors such as a processing capacity, a chip size, and a required memory bandwidth. Therefore, a plurality of chips with processing capabilities compliant with a current standard are used in parallel to deal with further expansion of the standard.

In the MPEG-2, one picture consists of one or more slices, and each slice consists of one or more macroblocks. Each macroblock consists of luminance blocks, chrominance Cb blocks, and chrominance Cr blocks. Coding is performed for each of the blocks.

An MPEG coded bitstream has such a hierarchic structure. Therefore, if a plurality of chips are used to decode a coded bitstream, there are various possible units processed by a single chip. In order to separate a coded bitstream for parallel processing, there are a conventional method of separating image data coded using MPEG into slices, and a conventional method of separating such image data based on a plurality of color components, such as luminance and chrominance (see Patent Reference 1, for example).

Among these methods, the method of separating image data into data regarding luminance and data regarding chrominance has advantages of less data transfer among chips performing parallel processing. By the above method, reference image data for motion compensation which is used by a certain single chip for decoding is only a result of decoding of the certain single chip. On the other hand, if the image is decoded after being separated spatially, into slices for example, it is necessary to control for exchanging reference image and transferring data among chips. Therefore, the technique of separating data based on luminance and chrominance is structured and controlled simpler than the method of spatially separating.

FIG. 1 is a diagram showing a conventional decoding device separating image based on luminance and chrominance in order to decode the image, which is disclosed in Patent Reference 1. In FIG. 1, the conventional decoding device, which separating image into data regarding luminance and data regarding chrominance to decode the image, includes a luminance decoder 101, a chrominance decoder 102, a luminance memory 103, a chrominance memory 104, and a synthesis unit 105.

The luminance decoder 101 and the chrominance decoder 102 receive a coded bitstream of color image data. Then, the luminance decoder 101 decodes pieces of data regarding luminance component in the color image data, and the chrominance decoder 102 decodes pieces of data regarding chrominance component in the color image data.

The luminance memory 103 stores the pieces of data regarding luminance component which have been decoded from the color image data by the luminance decoder 101. The chrominance memory 104 stores the pieces of data regarding chrominance component which have been decoded from the color image data by the chrominance decoder 102.

The synthesis unit 105 synthesizes (a) the decoded image regarding luminance component provided from the luminance decoder 101 to (b) the decoded image regarding chrominance component provided from the chrominance decoder 102.

PRIOR ARTS

Patent Reference

Patent Reference 1: Japanese Unexamined Patent Application Publication No. 10-164584

Non-Patent Reference

Non-Patent Reference 1: MPEG-2 ISO/IEC13818-2 standard, ITU-T H.262 standard
Non-Patent Reference 2: H.264 ISO/IEC14496-10 standard, ITU-T H.264 standard

SUMMARY OF THE INVENTION

However, the conventional decoding devices have a problem that decoding efficiency is decreased if coded image data is separated based on a plurality of color components and then decoded.

In the structure of the conventional decoding device, the same MPEG coded bitstream is provided to each of the luminance decoder 101 and the chrominance decoder 102, and each decoder performs decoding. Since such decoding requires a large processing amount, it is crucial to reduce the processing amount. Therefore, the inventors of the present invention have earnestly researched to find that such a conventional decoding device often overlaps the same processing, such as variable length decoding, using two decoders, thereby decreasing efficiency in parallel processing.

Especially, the decoding processing using arithmetic coding, which is one scheme of variable length decoding of the H.264 standard, requires a large processing amount. Therefore, this decoding processing is significantly affected by the efficiency decrease resulting from such overlapping processing.

In order to solve the above problems of the conventional technologies, an object of the present invention is to provide a decoding device, a decoding method, and a receiving device, each of which can prevent decrease of efficiency in parallel processing when coded image data is separated based on a plurality of color components and then decoded.

In accordance with an aspect of the present invention for achieving the object, there is provided a decoding device that decodes coded image data having a plurality of color components, the decoding device comprising: a variable length decoding unit configured to perform variable length decoding on the coded image data to generate variable length decoded data; a separation unit configured to (i) separate the plurality of color components to a number of color components, and (ii) obtain, from the variable length decoded data generated by the variable length decoding unit, each of pieces of data to be decoded in decoding processes as necessary data required in at least one of decoding processes, each decoding processes corresponding to a corresponding component of the number of color components; and image reconstruction units each of the image reconstruction units corresponding to a corresponding component of the number of color components, and configured to generate a decoded image regarding the corresponding component using the necessary data obtained by the separation unit, the image reconstruction units performing the generation in parallel.

With the above structure, the input coded image data is applied with variable length decoding, and then, using the resulting variable length decoded data, decoded images are generated for the respective different color components. This means that, since variable length decoding is performed at once for all of the plurality of color components, it is not necessary to perform variable length decoding independently for each of the color components. Thereby, variable length decoding does not overlap between (among) processes regarding the different color components, and thereby such overlapping processing can be prevented. As a result, when coded image data is separated into pieces based on a plurality of color components and then decoded, it is possible to prevent reduction in efficiency of parallel processing, in other words, efficiency of the processes regarding the different color components which are performed in parallel.

It is preferable that the decoding device further includes: a parameter calculation unit configured to perform common processing using the variable length decoded data generated by the variable length decoding unit so as to generate common processed data, when each of at least two decoding processes among the decoding processes needs the common processing to generate the common processed data, wherein the separation unit is further configured to obtain, from the common processed data, each of pieces of data to be decoded as the necessary data required in one of the at least two decoding processes, and at least two of the image reconstruction units, each of the at least two of the image reconstruction units corresponding to a corresponding component of the number of color components for which the common processing is necessary in the corresponding decoding process, configured to generate the decoded image regarding the corresponding component, using the necessary data obtained by the separation unit. It is further preferable that the parameter calculation unit is configured to generate second data and third data, when (i) a first decoding process among the decoding processes needs the second data that is generated from first data to be decoded in the first decoding process and (ii) a second decoding process among the decoding processes needs the third data that is generated from the second data after the second data is generated from the first data, the first decoding process corresponding to a first color component of the number of color components, and the second decoding process corresponding to a second color component of the number of color components, the separation unit is configured to obtain the second data as the necessary data required in the first decoding process, and the third data as the necessary data required in the second decoding process, one of the image reconstruction units, which corresponds to the first color component, is configured to generate a decoded image regarding the first color component using the second data, and one of the image reconstruction units, which corresponds to the second color component, is configured to generate a decoded image regarding the second color component using the third data.

When at least two decoding processes, namely, processes of generating decoded images, need the same common processing, the common processing is previously performed only once in the above structure. In other words, in the above structure, such common processing is performed prior to the decoding processes regarding the respective color components, namely, the number of color components. Therefore, the common processing does not overlap among the processes regarding the respective color components, and such overlapping processing can be prevented. As a result, when coded image data is separated into pieces based on a plurality of color components and then decoded, it is possible to prevent reduction in efficiency of parallel processing.

It is still further preferable that the decoding device further includes a control unit configured to decide a separation method of separating the plurality of color components to the number of color components, based on a chrominance format of the coded image data, wherein the separation unit is configured to (i) separate the plurality of color components to the number of color components according to the separation method decided by the control unit, and (ii) obtain the necessary data required in each of the decoding processes, and each of the image reconstruction units is configured to generate a decoded image regarding the corresponding component, according to the separation method decided by the control unit. It is still further preferable that the control unit is configured to decide the separation method by which a fourth color component is separated into color components that are more than a third color component, when a number of pixels regarding the fourth color component is larger than a number of pixels regarding the third color component in the plurality of color components of the coded image data.

With the above structure, the separation method is decided to average the number of pixels between (among) the color components, and then decoding processes, namely, the generation of the decoded images, are performed. If there is a difference in a processing amount between (among) the decoding processes regarding the color components, the efficiency of the decoding process regarding a color component having a large processing amount is reduced. Therefore, by averaging the processing amounts between the decoding processes regarding the color components, it is possible to reduce the factors of the processing efficiency reduction, and thereby to prevent reduction in efficiency of parallel processing.

It is still further preferable that each of the image reconstruction units includes a configuration change unit configured to (i) obtain, from the control unit, information that indicates, among the number of color features, a color component of the necessary data which is provided to the each of the image reconstruction units, and (ii) output an instruction signal to instruct the each of the image reconstruction units to generate a decoded image regarding the color component indicated in the information using the necessary data. It is still further preferable that the decoding device further includes a resulting-image synthesis unit configured to generate a resulting decoded image of the coded image data, by synthesizing the decoded images generated by the image reconstruction units, wherein the resulting-image synthesis unit is configured to generate the resulting decoded image according to the separation method decided by the control unit.

With the above structure, according to the decided separation method of separating the plurality of color components, instruction signals are outputted to generate decoded images regarding the respective separated color components, namely, the number of color components. Therefore, regardless of the separation method, it is possible to generate decoded images regarding the respective separated color components. In addition, by synthesizing the decoded images regarding the respective separated color components together, it is possible to generate a resulting decoded image of the input coded image data.

It is still further preferable that the decoding device further includes a region dividing unit configured to divide a region of the coded image data into a plurality of regions; a plurality of variable length decoding units including the variable length decoding unit, the variable length decoding units each corresponding to a part of the coded image data, and the part corresponding to a corresponding one of the plurality of regions; a plurality of separation units including the separation unit, the separation units each corresponding to a corresponding one of the variable length decoding units; a plurality of image reconstruction units including the image reconstruction units, the plurality of image reconstruction units each corresponding to a corresponding one of the separation units; and a resulting-image-region synthesis unit configured to generate a resulting decoded image of the coded image data, by synthesizing the decoded images generated by the plurality of image reconstruction units.

With the above structure, the decoding processes, namely, the generation of the decoded images, are performed after dividing a region of the coded image data into a plurality of regions. As a result, it is possible to reduce a processing amount of each of the decoding processes.

It is still further preferable that the decoding device further includes a plurality of region dividing units each configured to divide a region regarding a corresponding color component of the number of color components into a plurality of regions, the region being of the coded image data, and the number of color components being separated from the plurality of color components by the separation unit; and a plurality of image reconstruction units including the image reconstruction units, the plurality of image reconstruction units each corresponding to a corresponding one of the plurality of regions each of which corresponds to one of the number of color components.

With the above structure, the decoding processes, namely, the generation of the decoded images, are performed after dividing a region regarding each of the separated color components of the coded image data into a plurality of regions. In other words, a region regarding a color component having more pixels is divided into more color components. Thereby, it is possible to average processing amounts of the image reconstruction units. By averaging the processing amounts of the image reconstruction units, it is possible to prevent reduction in efficiency of parallel processing.

Moreover, the present invention can be implemented not only as the above decoding device, but also as a receiving device having the decoding device. The present invention can be implemented also as an integrated circuit that includes the units of the decoding device and controls the decoding device, or as a method including steps performed by the units of the decoding device. The present invention can be implemented also as: a program causing a computer to execute the steps of the decoding method; a computer-readable recording medium, such as a Compact Disc-Read Only Memory (CD-ROM), on which the program is recorded; information, data, or signals indicating the program; and the like. Of course, the program, information, data, and signals can be distributed by a communication network such as the Internet.

The decoding device according to the present invention can significantly reduce overlapping processing when coded image data is separated based on a plurality of color components and then decoded, which makes it possible to efficiently perform image decoding that requires a huge calculation amount.

BRIEF DESCRIPTION OF DRAWINGS

FIG. 13 is a diagram showing positions of luminance and chrominance samples when a chrominance format is 4:2:0.

FIG. 14 is a diagram showing positions of luminance and chrominance samples when a chrominance format is 4:2:2.

FIG. 22 is a block diagram showing an example of a digital broadcasting receiving device.

DETAILED DESCRIPTION OF THE INVENTION

The following describes embodiments of the present invention with reference to the drawings.

First Embodiment

Figure 2:
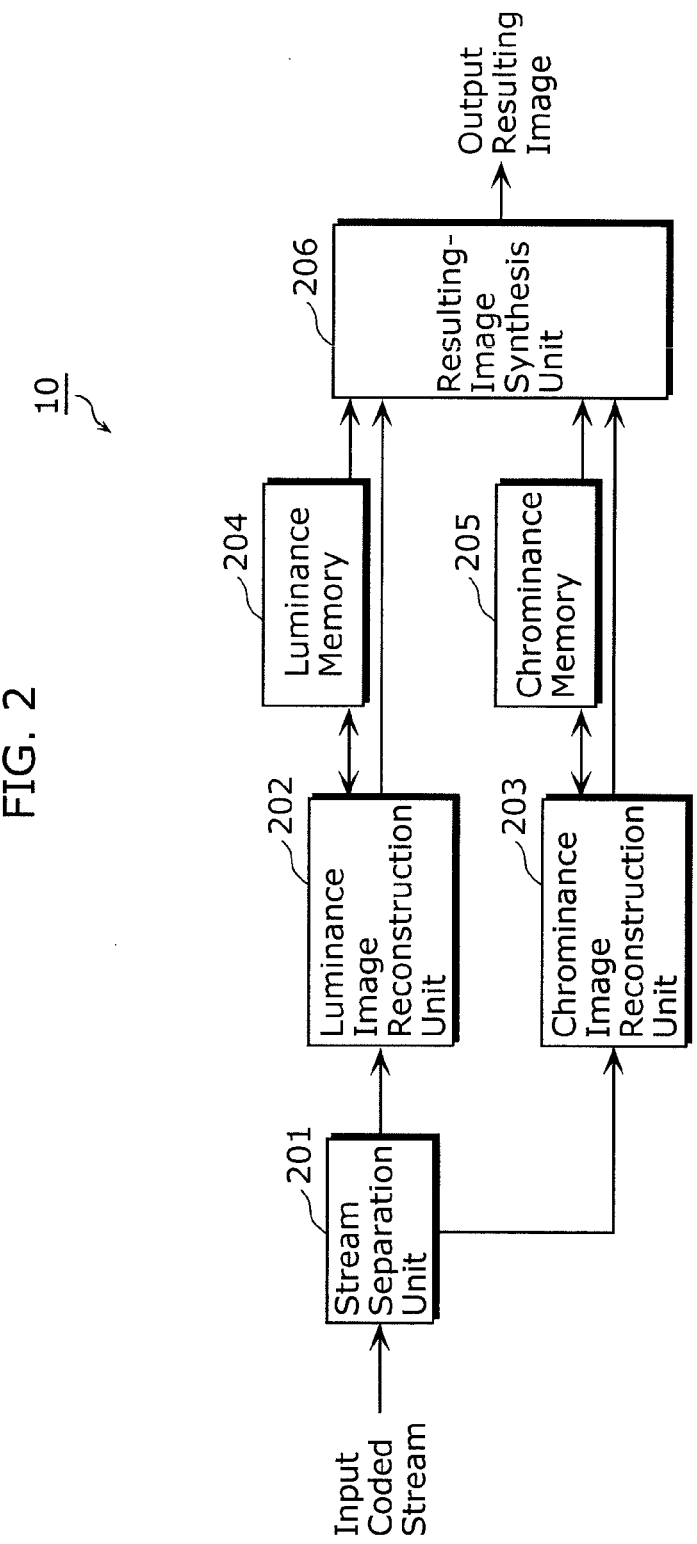
FIG. 2 is a block diagram showing an example of a decoding device according to a first embodiment of the present invention.

FIG. 2 is a block diagram showing an example of a decoding device 10 according to the first embodiment of the present invention.

The decoding device 10 according to the first embodiment performs decoding processes according to MPEG-2. As shown in FIG. 2, the decoding device 10 according to the first embodiment includes a stream separation unit 201, a luminance image reconstruction unit 202, a chrominance image reconstruction unit 203, a luminance memory 204, a chrominance memory 205, and a resulting-image synthesis unit 206. Here, the luminance image reconstruction unit 202 and the chrominance image reconstruction unit 203 correspond to the "image reconstruction unit" in the aspect of the present invention.

The following describes processing performed by the decoding device 10 according to the first embodiment with reference to FIG. 2.

The stream separation unit 201 separates input coded image data having a plurality of color components, into pieces of data each of which is required in at least one of decoding processes each corresponding to a corresponding one of predetermined number of color components. It is assumed that the coded image data has two color components which are a luminance component and a chrominance component, as the predetermined number of color components as mentioned above. In other words, the stream separation unit 201 separates the input coded bitstream into (a) pieces of data required in a decoding process regarding luminance component and (b) pieces of data required in a decoding process regarding chrominance component.

Then, the stream separation unit 201 provides (a) the data required in the decoding process regarding luminance component to the luminance image reconstruction unit 202, and provides (b) the data required in the decoding process regarding chrominance component to the chrominance image reconstruction unit 203. In addition, the stream separation unit 201 provides the common data required both in the decoding process regarding luminance component and in the decoding process regarding chrominance component to each of the luminance image reconstruction unit 202 and the chrominance image reconstruction unit 203.

Using pieces of data required in a decoding process regarding the luminance component among the predetermined number of color components (hereinafter, referred to as a "decoding process regarding luminance component"), the luminance image reconstruction unit 202 generates a decoded image regarding luminance component. On the other hand, using pieces of data required in a decoding process regarding the chrominance component among the predetermined number of color components (hereinafter, referred to as a "decoding process regarding chrominance component"), the chrominance image reconstruction unit 203 generates a decoded image regarding chrominance component. Here, the luminance image reconstruction unit 202 and the chrominance image reconstruction unit 203 perform the generation of respective decoded images in parallel.

In other words, using (a) the data required in the decoding process regarding luminance component, which is provided to the luminance image reconstruction unit 202, and (d) a decoded image regarding luminance component stored in the luminance memory 204, the luminance image reconstruction unit 202 performs inverse quantization, inverse transformation, motion compensation, and the like in order to generate a decoded image regarding luminance component. Then, the luminance image reconstruction unit 202 stores the generated decoded image to the luminance memory 204 and also outputs the same decoded image as a result.

On the other hand, using (b) the data required in the decoding process regarding chrominance component, which is provided to the chrominance image reconstruction unit 203, and (e) a decoded image regarding chrominance component stored in the chrominance memory 205, the chrominance image reconstruction unit 203 performs inverse quantization, inverse transformation, motion compensation, and the like in order to generate a decoded image regarding chrominance component. Then, the chrominance image reconstruction unit 203 stores the generated decoded image to the chrominance memory 205 and also outputs the same decoded image as a result.

The luminance memory 204 holds information to be used in the decoding process regarding luminance component that is performed by the luminance image reconstruction unit 202. The information is, for example, a decoded image regarding luminance which is to be used as a reference image.

The chrominance memory 205 holds information to be used in the decoding process regarding chrominance component that is performed by the chrominance image reconstruction unit 203. The information is, for example, a decoded image regarding chrominance component which is to be used as a reference image.

The resulting-image synthesis unit 206 receives the decoded image regarding luminance component from the luminance image reconstruction unit 202 and the decoded image regarding chrominance component from the chrominance image reconstruction unit 203, and synthesizes these decoded images together to be a resulting decoded image.

Figure 3:
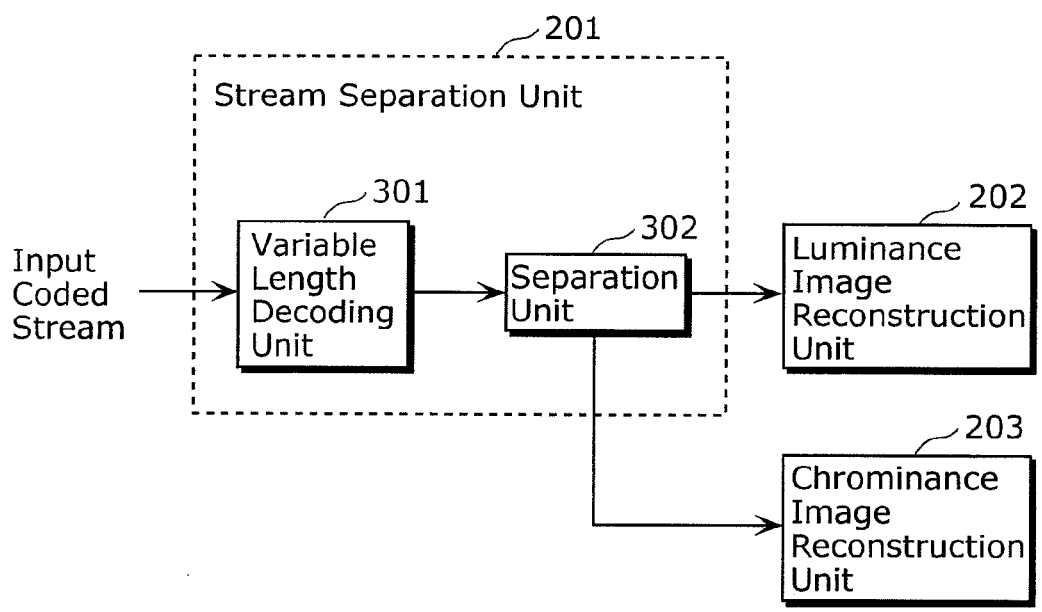
FIG. 3 is a block diagram showing an example of a stream separation unit in the decoding device according to the first embodiment of the present invention.

Next, the processing performed by the stream separation unit 201 is described with reference to the block diagram of FIG. 3. FIG. 3 is a block diagram showing an example of the stream separation unit 201 in the decoding device 10 according to the first embodiment of the present invention. The stream separation unit 201 includes the variable length decoding unit 301 and the separation unit 302.

The variable length decoding unit 301 performs variable length decoding on input coded image data to generate variable length decoded data. More specifically, the variable length decoding unit 301 decodes variable length codes in the input coded bitstream and provides resulting variable length decoded data to the separation unit 302.

Figure 4:
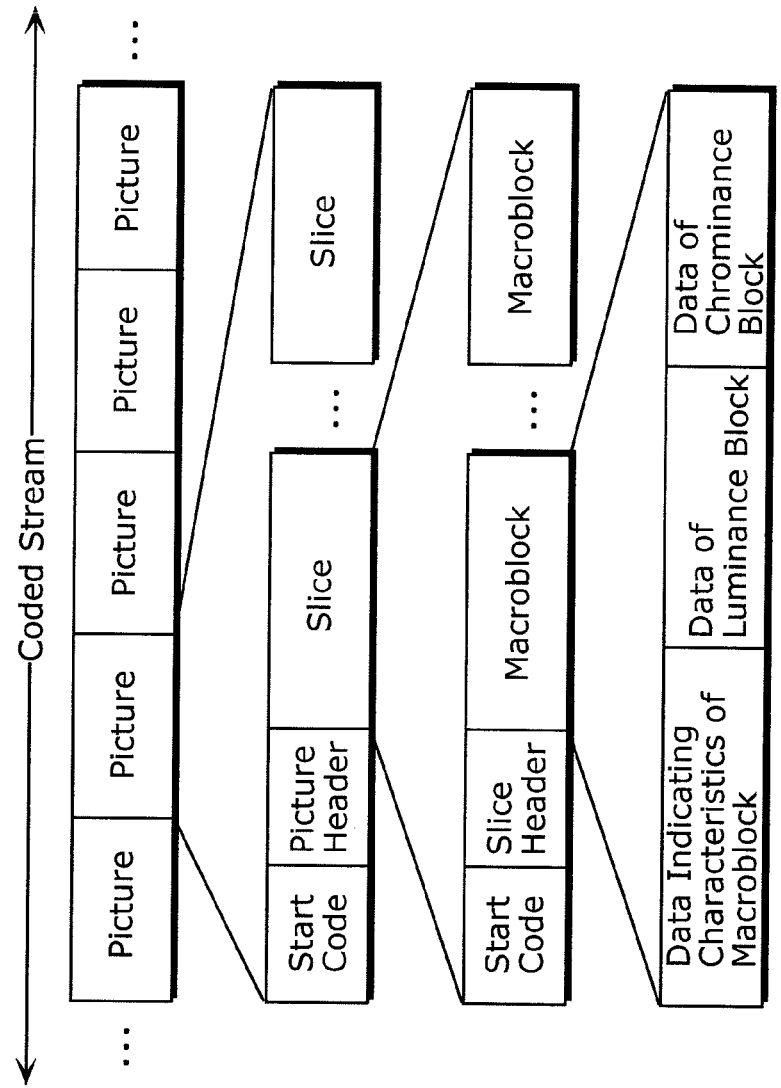
FIG. 4 is a schematic block diagram showing an MPEG-2 coded bitstream.

Why variable length decoding is necessary before separating is explained with reference to a schematic diagram showing a structure of an MPEG-2 stream of FIG. 4. FIG. 4 is a schematic block diagram showing an MPEG-2 coded bitstream.

As shown in FIG. 4, in an MPEG-2 coded bitstream, a picture includes a start code, a picture header, and one or more slices. Each slice includes a start code, a slice header, and one or more macroblocks. Here, a start code is a fixed length bit sequence indicating a boundary between pictures or slices. Each macroblock includes data indicating characteristics of the macroblock, data of luminance blocks, and data of chrominance blocks.

The above-described pieces of data can be classified into the following three types, depending on whether or not the corresponding data is required in the decoding process regarding luminance component and/or required in the decoding process regarding chrominance component.
 (a) data required only in the decoding process regarding luminance component
 (b) data required only in the decoding process regarding chrominance component
 (c) common data required both in the decoding process regarding luminance component and in the decoding process regarding chrominance component.

For example, a picture header or a slice header is common data required both in the decoding process regarding luminance component and in the decoding process regarding chrominance component.

Examples of the data indicating characteristics of the macroblock among the pieces of data in a macroblock are a macroblock mode, motion information, and the like, which are required both in the decoding process regarding luminance component and in the decoding process regarding chrominance component. The data of luminance blocks, such as discrete cosine transform (DCT) coefficient information regarding luminance, is data to be decoded in the decoding process regarding luminance, in other words, data required regarding luminance component. The data of chrominance blocks, such as DCT coefficient information regarding chrominance, is data to be decoded regarding chrominance component, in other words, the data required in the decoding process regarding chrominance component.

In order to separate a coded bitstream, in other words, in order to determine each of pieces of data to be decoded in the coded bitstream, as being at least one of the above-mentioned three types of data, it is necessary to find boundaries among the pieces of data. Since a boundary of a picture header or a slice header can be found by detecting a fixed length start code, the coded bitstream can be divided into pieces without variable length decoding.

However, between macroblocks or in a macroblock, there is no such a start code at a boundary among (c) common data required both in the decoding process regarding luminance component and in the decoding process regarding chrominance component, (a) data required in the decoding process regarding luminance component, and (b) data required in the decoding process regarding chrominance component. Moreover, data of a macroblock is applied with variable length coding. Therefore, in a method such as bit parsing, it is not possible to separate the variable length decoded data into (a) pieces of data required only in the decoding process regarding luminance component, (b) pieces of data required only in the decoding process regarding chrominance component, and (c) pieces of common data required both in the decoding process regarding luminance component and in the decoding process regarding chrominance component. Therefore, it is necessary to decode variable length codes in the coded bitstream by decoding from a start code.

Referring back to FIG. 3, the separation unit 302 (i) separates, in other words, classifies, a plurality of color components to a predetermined number of color components, and (ii) determines each of pieces of data to be decoded, as data required in at least one of the decoding processes. Here, the pieces of data to be decoded are included in the variable length decoded data generated by the variable length decoding unit 301, and each of the decoding processes corresponds to a corresponding component of the predetermined number of color components.

More specifically, the separation unit 302 separates (classifies) color components of the coded image data to two color components which are luminance and chrominance. Then, the separation unit 302 separates a result of the variable length decoding provided from the variable length decoding unit 301, into (a) pieces of data required in the decoding process for luminance and (b) pieces of data required in the decoding process regarding chrominance component, in other words, the separation unit 302 determines each of to-be-decoded pieces of the variable length decoded data, as at least one of (a) a piece of data required in the decoding process for luminance and (b) a piece of data required in the decoding process regarding chrominance component. As a result, the separation unit 302 obtains (a) pieces of data to be decoded in the decoding process regarding luminance component and (b) pieces of data to be decoded in the decoding process regarding chrominance component.

Then, the separation unit 302 provides (a) the data required in the decoding process regarding luminance component to the luminance image reconstruction unit 202, and provides (b) the data required in the decoding process regarding chrominance component to the chrominance image reconstruction unit 203. Which is the data required in the decoding process regarding luminance component or the data required in the decoding process regarding chrominance component is determined using a calculation method defined by the corresponding standard.

For example, a picture header or a slice header, a macroblock mode or motion information in pieces of data in a macroblock, or the like is required both in the decoding process regarding luminance component and in the decoding process regarding chrominance component. The DCT coefficient information regarding luminance is required in the decoding process regarding luminance component, and the DCT coefficient information regarding chrominance is required in the decoding process regarding chrominance component. The common data required both in the decoding process regarding luminance component and in the decoding process regarding chrominance component is provided to both the luminance image reconstruction unit 202 and the chrominance image reconstruction unit 203.

Figure 5:
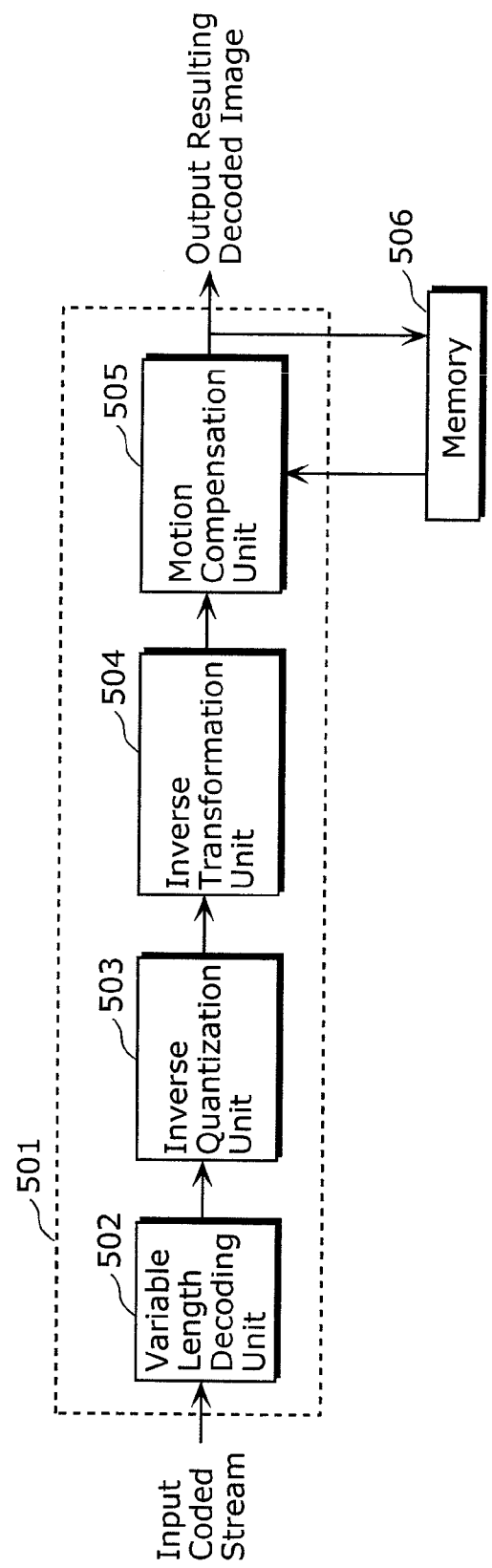
FIG. 5 is a block diagram showing an example of a general MPEG-2 decoder.
Figure 6:
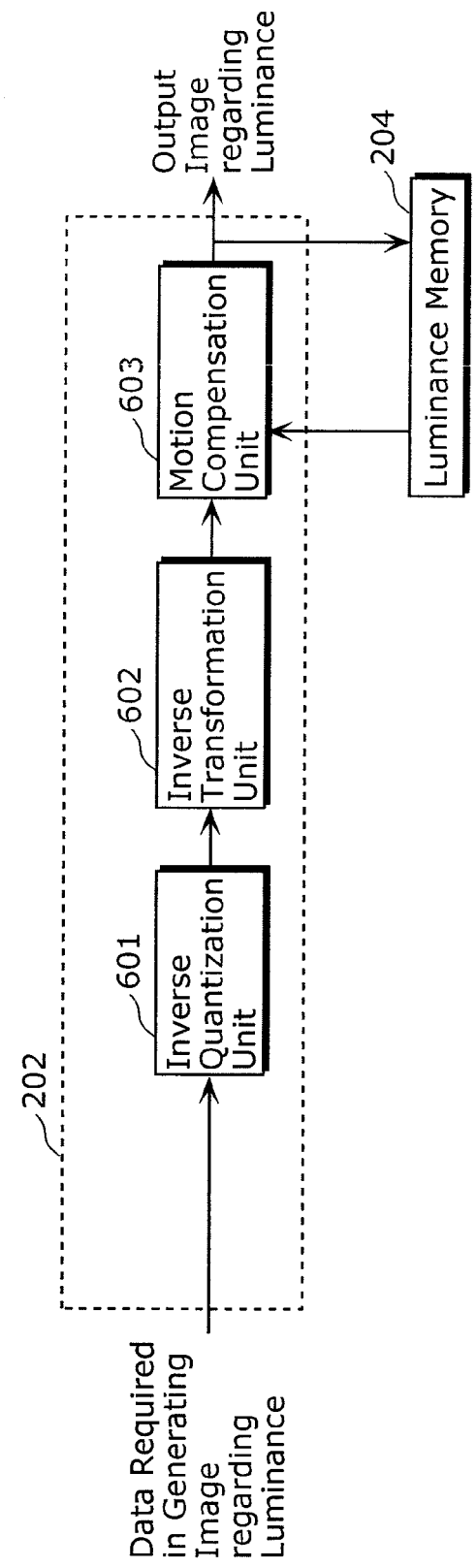
FIG. 6 is a block diagram showing an example of a luminance image reconstruction unit according to the first embodiment of the present invention.

Next, the internal structure of the luminance image reconstruction unit 202 is described with reference to FIGS. 5 and 6. FIG. 5 is a block diagram of a conventional general MPEG-2 decoder. FIG. 6 is a block diagram of a luminance image reconstruction unit 202 according to the first embodiment.

As shown in FIG. 5, the general MPEG-2 decoder 501 includes a variable length decoding unit 502, an inverse quantization unit 503, an inverse transformation unit 504, and a motion compensation unit 505. The general MPEG-2 decoder 501 provides a resulting decoded image to a memory 506, and later uses the image as a reference image in motion compensation for a subsequent picture to be decoded.

The variable length decoding unit 502 performs variable length decoding on an input coded bitstream, and provides a result of the decoding to the inverse quantization unit 503.

The inverse quantization unit 503 performs inverse quantization for the data received from the variable length decoding unit 502, and provides a result to the inverse transformation unit 504.

The inverse transformation unit 504 performs inverse DCT for the data received from the inverse quantization unit 503, and provides a result to the motion compensation unit 505.

The motion compensation unit 505 performs motion compensation for the data received from the inverse transformation unit 504 with reference to a reference image stored in the memory 506, and outputs a resulting decoded image. Each of the inverse quantization unit 503, the inverse transformation unit 504, and the motion compensation unit 505 performs corresponding processing for (a) each of pieces of data regarding luminance component and (b) each of pieces of data regarding chrominance component.

In comparison with the above conventional general decoder, FIG. 6 shows a structure of the luminance image reconstruction unit 202 according to the first embodiment. The luminance image reconstruction unit 202 includes an inverse quantization unit 601, an inverse transformation unit 602, and a motion compensation unit 603. The luminance image reconstruction unit 202 provides a luminance image resulting from the corresponding processing to the luminance memory 204, and later uses the image as a reference image in motion compensation for a subsequent picture to be decoded.

Input signals of the luminance image reconstruction unit 202 are generated by retrieving only data required in the decoding process regarding luminance component from a result of variable length decoding on an MPEG-2 coded bitstream, not directly from the MPEG-2 coded bitstream. Therefore, the luminance image reconstruction unit 202 does not need the variable length decoding unit 502 that is necessary in the general MPEG-2 decoder 501.

The luminance image reconstruction unit 202 includes the inverse quantization unit 601, the inverse transformation unit 602, and the motion compensation unit 603, likewise in the general MPEG-2 decoder 501. The inverse quantization unit 601 performs the same processing as that of the inverse quantization unit 503, the inverse transformation unit 602 performs the same processing as that of the inverse transformation unit 504, and the motion compensation unit 603 performs the same processing as that of the motion compensation unit 505. However, each of the units receives only data required in the decoding process regarding luminance component and performs the corresponding processing only for pieces of data regarding luminance component.

The internal structure of the chrominance image reconstruction unit 203 is similar to that of the luminance image reconstruction unit 202, and performs processing in the similar manner as the luminance image reconstruction unit 202 except that an input is only data required in the decoding process regarding chrominance component and the processing is performed only for pieces of data regarding chrominance component not for pieces of data regarding luminance component.

Next, the decoding processing performed by the decoding device 10 according to the first embodiment is described.

Figure 7:
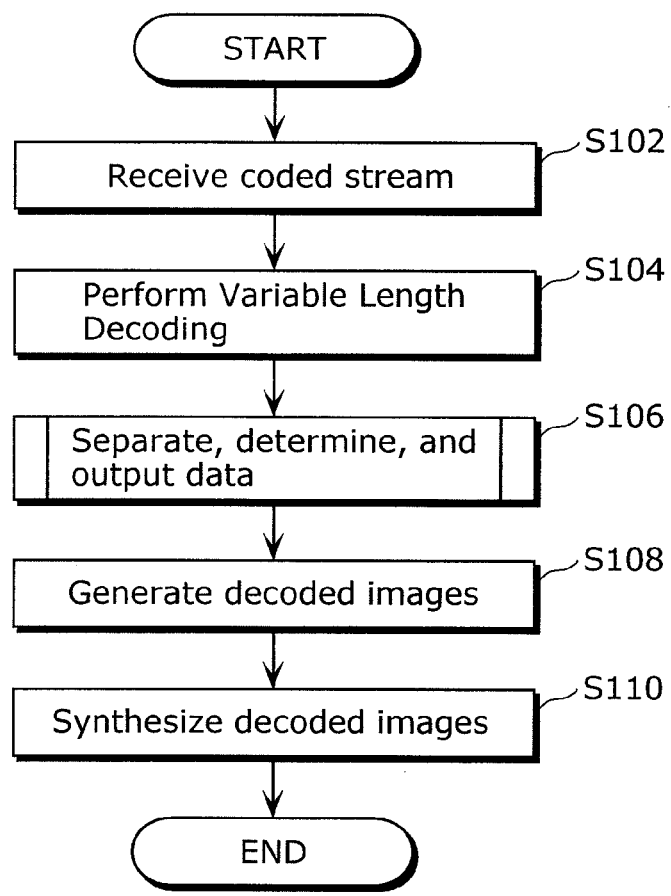
FIG. 7 is a flowchart of an example of decoding performed by the decoding device according to the first embodiment of the present invention.

FIG. 7 is a flowchart of an example of decoding processing performed by the decoding device 10 according to the first embodiment of the present invention.

As shown in FIG. 7, firstly, a coded bitstream having color components is received (Step S102).

Then, the variable length decoding unit 301 performs variable length decoding on the received (input) coded bitstream (Step S104).

Then, the separation unit 302 separates a result of the variable length decoding of the variable length decoding unit 301 into (a) pieces of data required in the decoding process regarding luminance component and (b) pieces of data required in the decoding process regarding chrominance component, in other words, the separation unit 302 determines each of to-be-decoded pieces of the variable length decoded data as at least one of (a) and (b), and also provides (a) the pieces of data required in the decoding process regarding luminance component to the luminance image reconstruction unit 202 and (b) the pieces of data required in the decoding process regarding chrominance component to the chrominance image reconstruction unit 203 (Step S106). The above processing (hereinafter, referred to also as "luminance/chrominance separation processing") performed by the separation unit 302 will be described later in more detail.

Then, the luminance image reconstruction unit 202 generates a decoded image regarding luminance component, and the chrominance image reconstruction unit 203 generates a decoded image regarding chrominance component. The luminance image reconstruction unit 202 and the chrominance image reconstruction unit 203 perform respective generation in parallel (Step S108).

Then, the resulting-image synthesis unit 206 synthesizes (a) the decoded image regarding luminance component provided from the luminance image reconstruction unit 202 with (b) the decoded image regarding chrominance component provided from the chrominance image reconstruction unit 203, thereby generating a resulting decoded image (Step S110).

Figure 8:
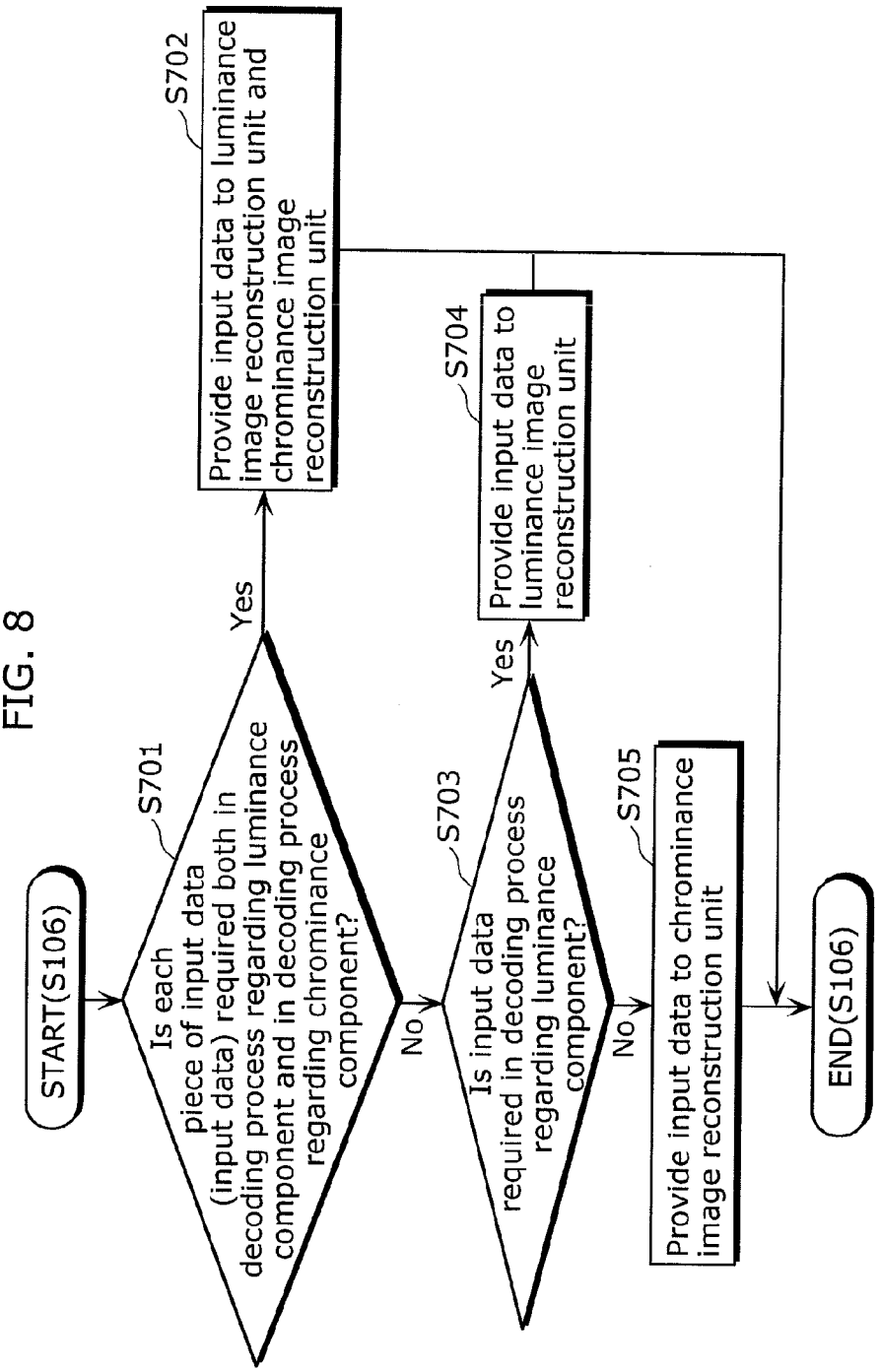
FIG. 8 is a flowchart of an example of luminance/chrominance separation processing performed by the separation unit in the decoding device according to the first embodiment of the present invention.

Next, the luminance/chrominance separation processing (Step S106 in FIG. 7) performed by the separation unit 302 for input data provided from the variable length decoding unit 301 is described with a flowchart of FIG. 8.

FIG. 8 is a flowchart of an example of the luminance/chrominance separation processing (Step S106 in FIG. 7) performed by the a separation unit 302 in the decoding device 10 according to the first embodiment of the present invention.

As shown in FIG. 8, firstly, the separation unit 302 determines whether or not input data, namely, a piece to be decoded in the variable length decoded data, received from the variable length decoding unit 301 is required both in the decoding process regarding luminance component and in the decoding process regarding chrominance component (Step S701).

When the input data is a syntax such as a picture header or a slice header or is a macroblock or motion information in data included in a macroblock, the separation unit 302 determines that the input data is required both in the decoding process regarding luminance component and in the decoding process regarding chrominance component (Yes at Step S701). If so, then the separation unit 302 provides the input data both to the luminance image reconstruction unit 202 and the chrominance image reconstruction unit 203 (Step S702).

If the separation unit 302 determines that the input data is not required in the decoding process regarding luminance component or not required in the decoding process regarding chrominance component (No at Step S701), the processing proceeds to Step S703.

Next, the separation unit 302 determines whether or not the input data is required in the decoding process regarding luminance component (Step S703).

When the input data is DCT coefficient information or the like regarding luminance, the separation unit 302 determines that the input data is required in the decoding process regarding luminance component (Yes at Step S703). If so, the separation unit 302 provides the input data to the luminance image reconstruction unit 202 (Step S704).

If the separation unit 302 determines that the input data is not required in the decoding process regarding luminance component (No at Step S703), then the separation unit 302 determines that the input data is required only in the decoding process regarding chrominance component and provides the input data to the chrominance image reconstruction unit 203 (Step S705).

Thereby, the luminance/chrominance separation processing (Step S106 in FIG. 7) performed by the separation unit 302 for the input data is completed. Then, the separation unit 302 starts the luminance/chrominance separation processing for a next piece to be decoded in the variable length decoded data.

As described above, the decoding device 10 according to the first embodiment separates variable length decoded data based on luminance and chrominance, and decodes the separated pieces of data in parallel for luminance and chrominance, so as to decode an MPEG-2 coded bitstream. Here, Moreover, the decoding device 10 according to the first embodiment does not provide the same stream to a luminance decoder and a chrominance decoder in order to perform overlapping decoding processes by these decoders in parallel. However, the decoding device 10 according to the first embodiment has the stream separation unit 201 at the previous stage, and provides only pieces of data required in the decoding process regarding luminance component to the luminance image reconstruction unit 202, and provides only pieces of data required in the decoding process regarding chrominance component to the chrominance image reconstruction unit 203. Thereby, it is possible to reduce processing which overlap between the luminance image reconstruction unit 202 and the chrominance image reconstruction unit 203. As a result, the luminance image reconstruction unit 202 and the chrominance image reconstruction unit 203 have structures simpler than a structure of a general MPEG-2 decoder, reducing calculation resources and memory resources.

It should be noted that it has been described in the first embodiment that the variable length decoding unit 301 decodes all variable length codes, but it is also possible to perform variable length decoding only for a part of a coded bitstream requiring variable length decoding. In other words, in order to separate variable length decoded data into (a) pieces of data required in the decoding process regarding luminance component and (b) pieces of data required in the decoding process regarding chrominance component by the separation unit 302, it is also possible that the variable length decoding unit 301 performs variable length decoding only on a part of a coded bitstream requiring variable length decoding, and if the other part of the coded bitstream can be separated without variable length decoding, the other part is provided directly to the luminance image reconstruction unit 202 and the chrominance image reconstruction unit 203.

In this case, each of the luminance image reconstruction unit 202 and the chrominance image reconstruction unit 203 needs a variable length decoding unit. In general, a coded bitstream has a less data amount than that of variable length decoded data. Therefore, if the stream separation unit 201 does not perform variable length decoding for all of the coded bitstream but outputs a part of the coded bitstream without variable length decoding, there are advantages of reducing a capacity of an intermediate buffer exchanging data between the stream separation unit 201 and the luminance image reconstruction unit 202 and between the stream separation unit 201 and the chrominance image reconstruction unit 203.

It should also be noted that it has been described that the separation unit 302 provides (a) pieces of data required in the decoding process regarding luminance component and (b) pieces of data required in the decoding process regarding chrominance component, directly to the luminance image reconstruction unit 202 and the chrominance image reconstruction unit 203, respectively, but it is also possible that the separated pieces of data are coded and compressed again and provided to the luminance image reconstruction unit 202 and the chrominance image reconstruction unit 203, respectively, and that the luminance image reconstruction unit 202 and the chrominance image reconstruction unit 203 decode respective pieces of data and then perform decoding. Thereby, it is possible to reduce a capacity of an intermediate buffer exchanging data between the stream separation unit 201 and the luminance image reconstruction unit 202 and between the stream separation unit 201 and the chrominance image reconstruction unit 203. A method of coding separated pieces of data may be a method regulated by an image coding standard, or any other method.

It should also be noted that the luminance memory 204 and the chrominance memory 205 may be implemented as a single device or a plurality of devices.

It should also be noted that it has been described in the first embodiment that the decoding device 10 according to the first embodiment separates a coded bitstream based on two color components which are luminance and chrominance, but a method of separating a coded bitstream is not limited to the above. For example, the decoding device 10 according to the first embodiment may separate a coded bitstream based on three color components which are luminance, chrominance Cb, and chrominance Cr. Or, the decoding device 10 according to the first embodiment may separate a coded bitstream based on other components, for example, three colors which are red (R), green (G), and blue (B), and have a decoder and a memory for each of the colors.

Second Embodiment

In the first embodiment, the decoding device 10 has the separation unit 302 that determines whether or not input data, namely, each of to-be-decoded pieces of the variable length decoded data, is (a) data required only in the decoding process regarding luminance component, (b) data required only in the decoding process regarding chrominance component, or (c) common data required both in the decoding process regarding luminance component and in the decoding process regarding chrominance component, thereby controlling data to be provided to the luminance image reconstruction unit 202 and/or the chrominance image reconstruction unit 203.

In the meanwhile, in many image coding standards, (b) data required in the decoding process regarding chrominance component is calculated from (a) data required in the decoding process regarding luminance component, in order to decode the data regarding chrominance component.

Therefore, (c) common data required both in the decoding process regarding luminance component and in the decoding process regarding chrominance component is further classified into the following two types.

(c1) common data which can be directly used in the decoding process regarding luminance component and in the decoding process regarding chrominance component (c2) common data for which (a) data required in the decoding process regarding luminance component is to be generated from data included in a coded bitstream and (b) data required in the decoding process regarding chrominance component is to be calculated from data required in the decoding process regarding luminance component The "(c1) common data which can be directly used in the decoding process regarding luminance component and in the decoding process regarding chrominance component" is data which is not generated by calculating (b) data required in the decoding process regarding chrominance component from (a) data required in the decoding process regarding luminance component, but is capable of being decoded directly in the decoding process regarding luminance component and in the decoding process regarding chrominance component.

More specifically, examples of data to be used as (c1) the common data which can be directly used in the decoding process regarding luminance component and in the decoding process regarding chrominance component are a picture header, a slice header, and the like. In other words, a picture header or a slice header is used both in the decoding process regarding luminance component and in the decoding process regarding chrominance component, so that such a picture header or a slice header is considered as common data to be used for the same purpose.

On the other hand, an example of (c2) the common data for which (a) data required in the decoding process regarding luminance component is to be generated from data included in a coded bitstream and (b) data required in the decoding process regarding chrominance component is to be calculated from data required in the decoding process regarding luminance component is a motion vector regulated in MPEG-2. The following describes a method of calculating a motion vector according to MPEG-2 standard.

A coded bitstream does not have a motion vector itself, but merely has difference information regarding a target motion vector. The difference information is data to be decoded which is obtained by the variable length decoding.

On the other hand, a prediction value of a motion vector is calculated using other motion vectors of decoded macroblocks according to a method regulated in MPEG-2 standard. Using the difference information and the prediction value, a motion vector regarding luminance is calculated. Then, a motion vector regarding chrominance is calculated using the motion vector regarding luminance according to a method regulated in MPEG-2 standard.

In the first embodiment, the calculation of motion vectors is performed by the decoding device 10 in the following manner. First, the difference information, which is obtained when the variable length decoding unit 301 decodes a coded bitstream, is determined by the separation unit 302 as being common data required both in the decoding process regarding luminance component and in the decoding process regarding chrominance component.

Thereby, the difference information is provided to both the luminance image reconstruction unit 202 and the chrominance image reconstruction unit 203.

The luminance image reconstruction unit 202 firstly calculates a prediction value of a target motion vector based on motion vectors of macroblocks that have already been decoded. Then, the luminance image reconstruction unit 202 calculates a motion vector regarding luminance based on the received difference information and the calculated prediction value.

On the other hand, the chrominance image reconstruction unit 203 firstly calculates a motion vector regarding luminance, performing the same processing as that of the luminance image reconstruction unit 202. Next, based on the motion vector regarding luminance, the chrominance image reconstruction unit 203 calculates a motion vector regarding chrominance.

As described above, the first embodiment has a problem that, since the each of the luminance image reconstruction unit 202 and the chrominance image reconstruction unit 203 independently calculates a motion vector regarding luminance, the calculation processes overlap.

In the first embodiment, other data also has the same overlapping problem like the motion vector. When data required in the decoding process regarding chrominance component is calculated from data required in the decoding process regarding luminance component, each of the luminance image reconstruction unit 202 and the chrominance image reconstruction unit 203 perform the same calculation processes independently. Therefore, the calculation processes overlap. It is demanded to further improve efficiency of parallel processing by solving the overlapping problem.

The second embodiment of the present invention provides a decoding device satisfying the above demand.

Figure 1:
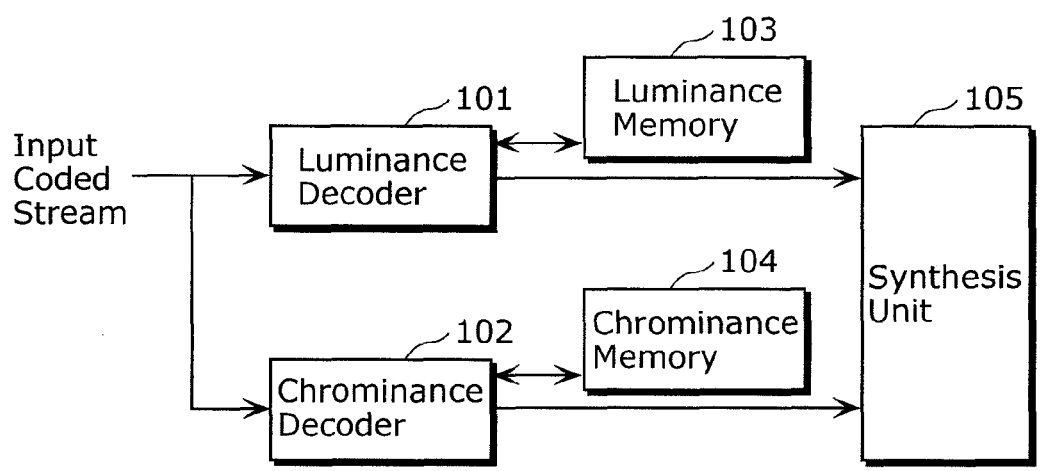
FIG. 1 is a block diagram showing an example of a conventional decoding device that performs decoding by separating an image into data regarding luminance and data regarding chrominance.
Figure 9:
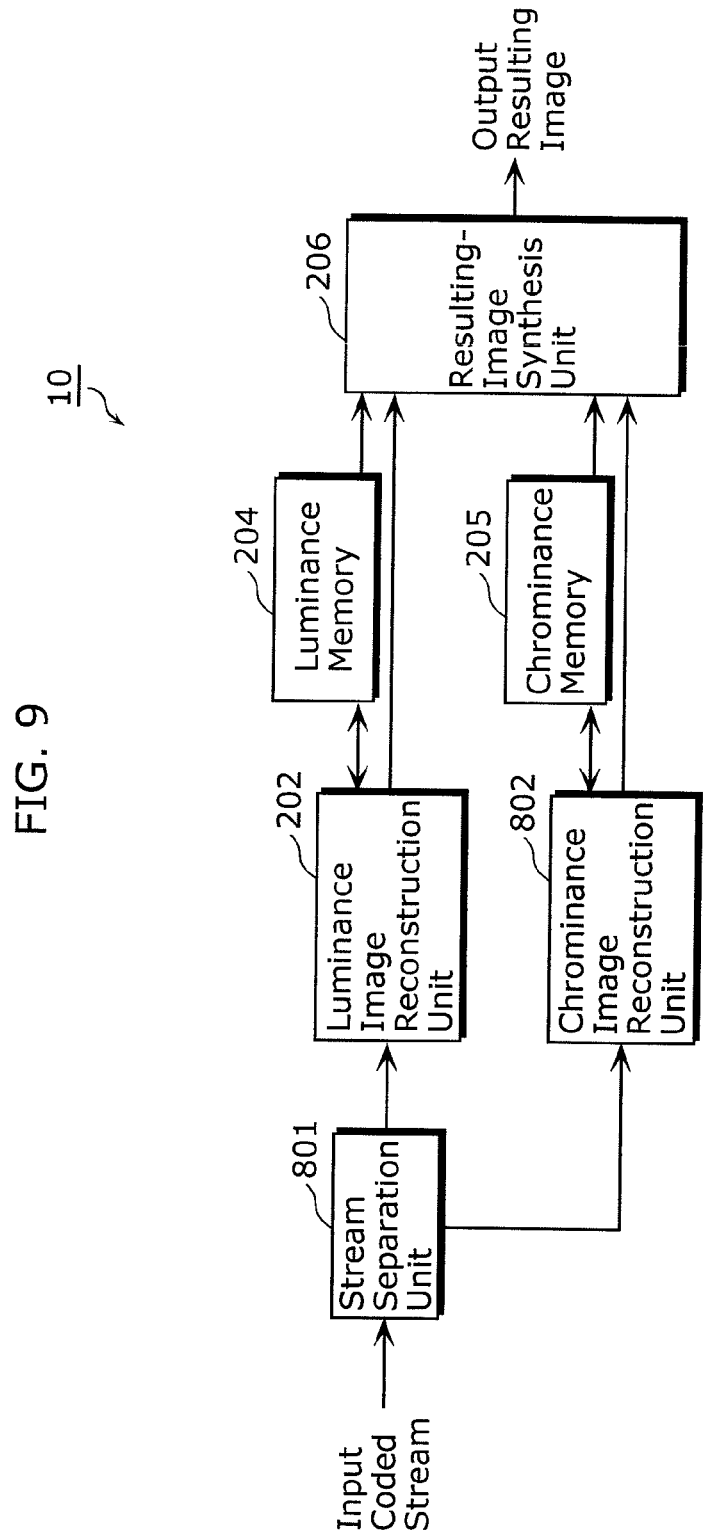
FIG. 9 is a block diagram showing an example of a decoding device according to a second embodiment of the present invention.

FIG. 9 is a block diagram showing an example of a decoding device 10 according to the second embodiment of the present invention. Here, the same reference numerals of FIG. 1 according to the first embodiment are assigned to the identical units of FIG. 9 performing the same processing, so that the identical units are not explained again below.

As shown in FIG. 9, the decoding device 10 according to the second embodiment performs decoding according to MPEG-2. The decoding device 10 according to the second embodiment includes a stream separation unit 801, the luminance image reconstruction unit 202, a chrominance image reconstruction unit 802, the luminance memory 204, the chrominance memory 205, and the resulting-image synthesis unit 206. Here, the chrominance image reconstruction unit 802 corresponds to the "image reconstruction unit" in the aspect of the present invention.

The following describes processing performed by the decoding device 10 according to the second embodiment.

The stream separation unit 801 performs variable length decoding for an input coded bitstream, and separates the result into (a) pieces of data required in the decoding process regarding luminance component and (b) pieces of data required in the decoding process regarding chrominance component, in other words, determines each of to-be-decoded pieces of the variable length decoded data as at least one of (a) and (b). Then, the stream separation unit 801 provides (a) the pieces of data required in the decoding process regarding luminance component to the luminance image reconstruction unit 202, and (b) the pieces of data required in the decoding process regarding chrominance component to the chrominance image reconstruction unit 802.

In addition, the stream separation unit 801 generates (a') data required in the decoding process regarding luminance component from data included in the coded bitstream. Then, for (c2) common data for which (b) data required in the decoding process regarding chrominance component is to be calculated from (a') data required in the decoding process regarding luminance component, the stream separation unit 801 calculates (b) the data required in the decoding process regarding chrominance component, before separating the result of the variable length decoding.

Using (b) the data required in the decoding process regarding chrominance component, which is provided to the chrominance image reconstruction unit 802, and (e) a decoded image regarding chrominance component stored in the chrominance memory 205, the chrominance image reconstruction unit 802 performs inverse quantization, inverse transformation, motion compensation, and the like in order to generate a decoded image regarding chrominance component. Then, the chrominance image reconstruction unit 802 stores the generated decoded image to the chrominance memory 205 and also provides the same decoded image to the chrominance image reconstruction unit 206.

The processing for calculating data required in the decoding process regarding chrominance component from data required in the decoding process regarding luminance component, which is performed in the chrominance image reconstruction unit 203 in the first embodiment, is performed in the stream separation unit 801 in the second embodiment. Therefore, the processing for calculating (b) data required in the decoding process regarding chrominance component from (a') data required in the decoding process regarding luminance component, which is performed by the chrominance image reconstruction unit 203 in the first embodiment, is not necessarily performed by the chrominance image reconstruction unit 802 in the second embodiment. Therefore, a structure of the chrominance image reconstruction unit 802 is simpler than the structure of the chrominance image reconstruction unit 203.

Next, the processing performed by the stream separation unit 801 is described in more detail with reference to the block diagram of FIG. 10.

Figure 10:
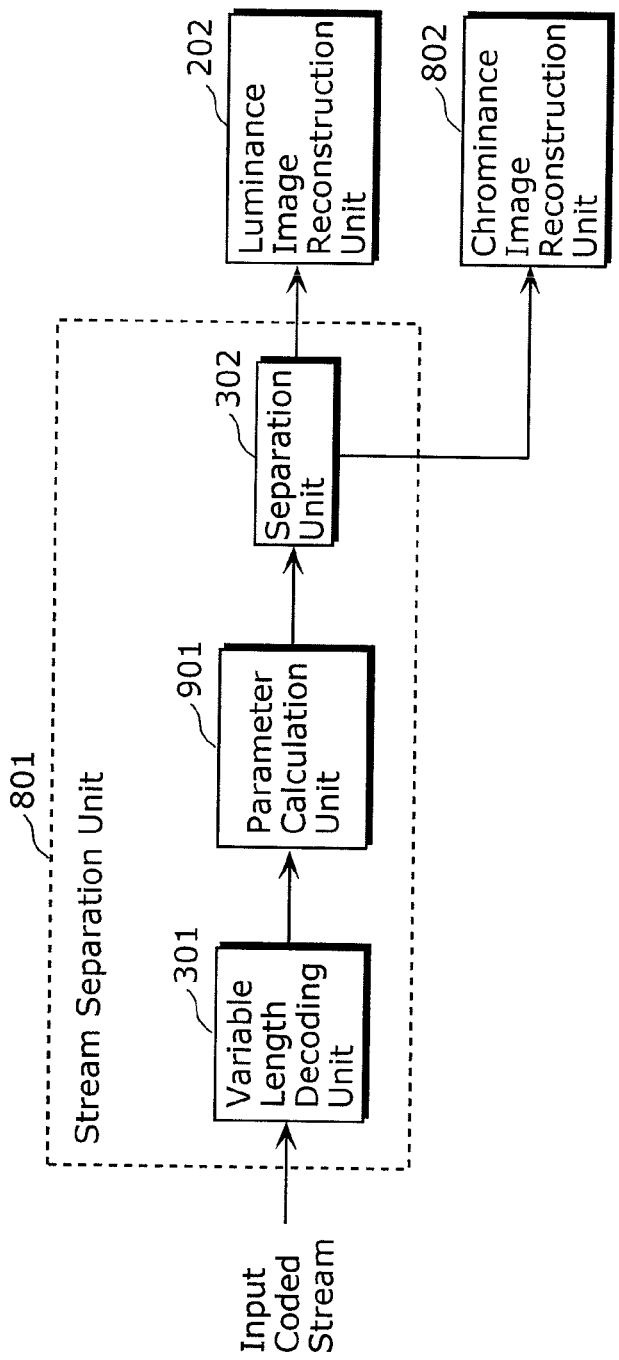
FIG. 10 is a block diagram showing an example of a stream separation unit in the decoding device according to the second embodiment of the present invention.

FIG. 10 is a block diagram showing an example of the stream separation unit 801 in the decoding device 10 according to the second embodiment of the present invention. Here, the same reference numerals of FIG. 3 according to the first embodiment are assigned to the identical units of FIG. 10 performing the same processing, so that the identical units are not explained again below.

As shown in FIG. 10, the stream separation unit 801 includes the variable length decoding unit 301, a parameter calculation unit 901, and the separation unit 302.

If each of at least two decoding processes among the decoding processes each corresponding to a corresponding component of the predetermined number of color components needs common processing so as to generate common processed data, the parameter calculation unit 901 previously performs the common processing using the variable length decoded data generated by the variable length decoding unit 301. Then, from the common processed data, the separation unit 302 obtains each of pieces of data to be decoded, as data required in one of at least two decoding processes for which the common processing is conventionally necessary. Then, using the obtained pieces of data, each of at least two image reconstruction units, which corresponds to a corresponding component of the color components for which the common processing is necessary in the corresponding decoding process, generates a decoded image regarding the corresponding component.

In more detail, when, (i) a decoding process regarding the first color component among the predetermined number of color components needs the second data that is generated from the first data to be decoded in the decoding process regarding the first color component, and (ii) a decoding process regarding the second color component needs the third data that is generated from the second data after the second data is generated from the first data, the parameter calculation unit 901 previously generates the second and third data. Then, the separation unit 302 obtains the second data as data required in the decoding process regarding the first color component, and the third data as data required in the decoding process regarding the second color component. Then, the image reconstruction unit corresponding to the first color component generates a decoded image regarding the first color component using the second data. The image reconstruction unit corresponding to the second color component generates a decoded image regarding the second color component using the third data.

For example, only when the data provided from the variable length decoding unit 301 is data for which (a) data required in the decoding process regarding luminance component is to be generated from data included in the coded bitstream and then (b) data required in the decoding process regarding chrominance component is to be generated from the data required in the decoding process regarding luminance component, the parameter calculation unit 901 previously calculates (a) the data required in the decoding process regarding luminance component and (b) the data required in the decoding process regarding chrominance component. In other words, the parameter calculation unit 901 calculates (b) the data required in the decoding process regarding chrominance component, using (a) the data required in the decoding process regarding luminance component. Then, the parameter calculation unit 901 provides both (a) the calculated data required in the decoding process regarding luminance component and (b) the calculated data required in the decoding process regarding chrominance component, to the separation unit 302.

Then, the separation unit 302 obtains (a) the data required in the decoding process regarding luminance component and (b) the data required in the decoding process regarding chrominance component, and then provides (a) the data required in the decoding process regarding luminance component to the luminance image reconstruction unit 202 and (b) the data required in the decoding process regarding chrominance component to the chrominance image reconstruction unit 802. Then, the luminance image reconstruction unit 202 generates a decoded image regarding luminance component using (a) the data required in the decoding processing regarding luminance component as generated above. The chrominance image reconstruction unit 802 generates a decoded image regarding chrominance component using (b) the data required in the decoding process regarding chrominance component as generated above.

Next, the decoding processing performed by the decoding device 10 according to the second embodiment is described.

Figure 11:
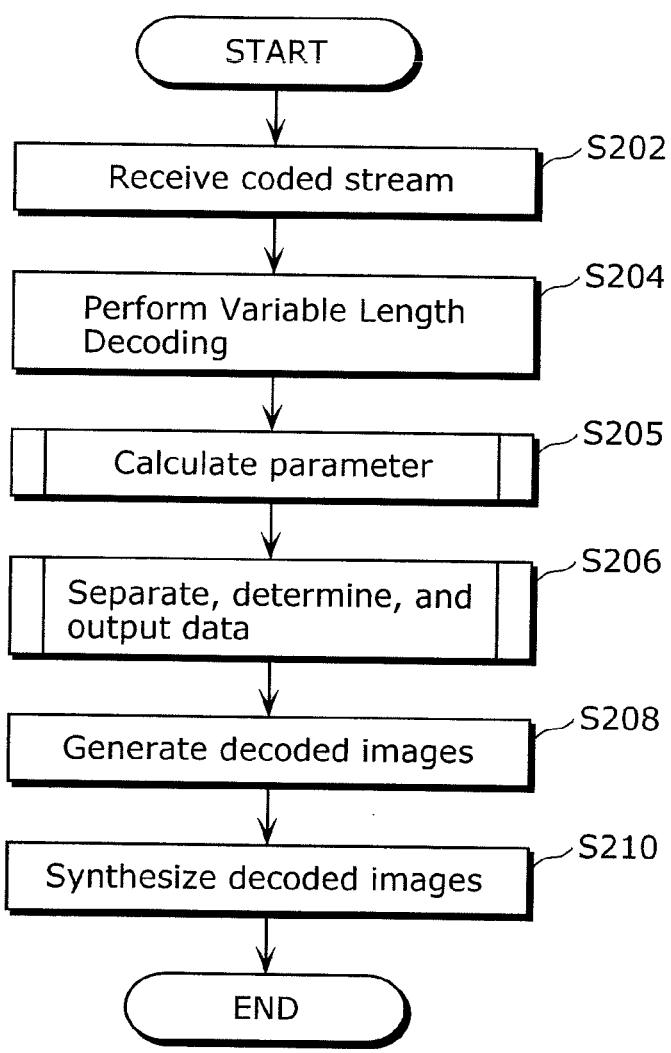
FIG. 11 is a flowchart of an example of decoding performed by the decoding device according to the second embodiment of the present invention.

FIG. 11 is a flowchart of an example of decoding processing performed by the decoding device 10 according to the second embodiment of the present invention.

In FIG. 11, a coded bitstream is received (Step S202), and the variable length decoding unit 301 performs variable length decoding on the coded bitstream (Step S204). Here, these steps (Step S202 to Step S204) are the same as the steps (Step S102 to Step S104) performed by the decoding device 10 according to the first embodiment shown in FIG. 7, and therefore the identical steps are not explained again below.

Then, when data required in the decoding process regarding chrominance component is necessary to be calculated using data required in the decoding process regarding luminance component, the parameter calculation unit 901 previously calculates the data required in the decoding process regarding chrominance component, using data required in the decoding process regarding luminance component (Step S205). The parameter calculation performed by the parameter calculation unit 901 will be described below in more detail.

Then, the separation unit 302 separates input data into pieces of data required to be decoded, thereby obtaining the pieces of data, and then provides them to the luminance image reconstruction unit 202 and/or the chrominance image reconstruction unit 802 (Step S206). Each of the luminance image reconstruction unit 202 and the chrominance image reconstruction unit 802 generates a decoded image (Step S208), and the resulting-image synthesis unit 206 synthesizes respective decoded images together to generate a resulting decoded image (Step S210). Here, the same step numerals (Step S106 to Step S110) of FIG. 7 in the processing performed by the decoding device 10 according to the first embodiment are assigned to the identical steps (Step S206 to Step S210) of FIG. 11, so that the identical steps are not explained again below.

Next, the parameter calculation (Step S205 in FIG. 11) performed by the parameter calculation unit 901 on data received from the variable length decoding unit 301 is described with reference to a flowchart of FIG. 12.

Figure 12:
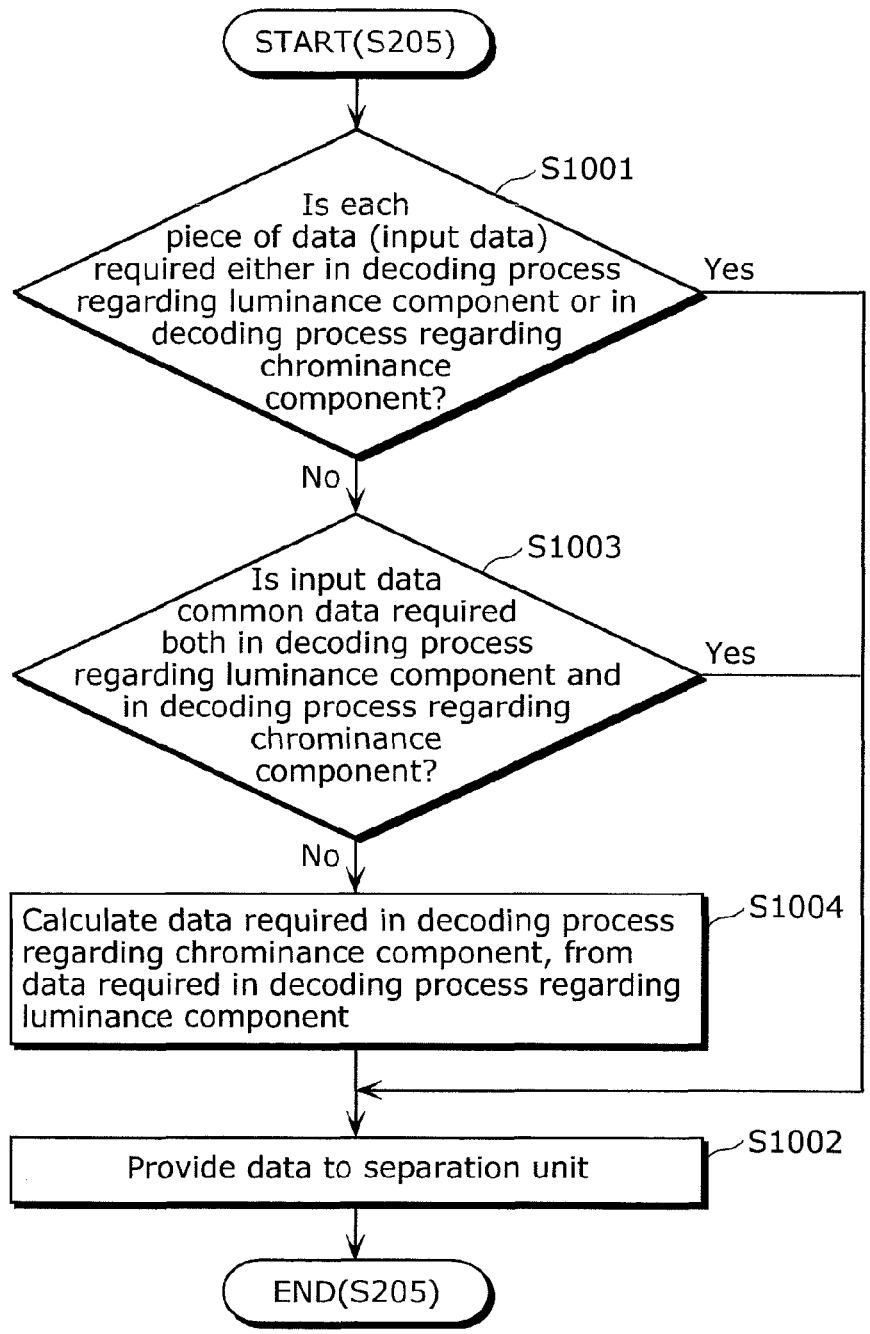
FIG. 12 is a flowchart of an example of parameter calculation performed by a parameter calculation unit according to the second embodiment of the present invention.

FIG. 12 is a flowchart of an example of the parameter calculation (Step S205 in FIG. 11) performed by the parameter calculation unit 901 according to the second embodiment of the present invention.

As shown in FIG. 12, first, the parameter calculation unit 901 determines whether or not input data (each of pieces of data to be decoded) received from the variable length decoding unit 301 is required only in the decoding process regarding luminance component either in the decoding process regarding chrominance component (Step S1001).

When the input data is DCT coefficient information regarding luminance or DCT coefficient information regarding chrominance, the parameter calculation unit 901 determines that the input data is required only in the decoding process regarding luminance component either in the decoding process regarding chrominance component (Yes at Step S1001). If so, then the parameter calculation unit 901 provides the input data to the separation unit 302 (Step S1002), and completes the parameter calculation.

If the parameter calculation unit 901 determines that the input data is required both in the decoding process regarding luminance component and in the decoding process regarding chrominance component (No at Step S1001), then the processing proceeds to Step S1003.

Then, the parameter calculation unit 901 determines whether or not the input data is to be used as common data required both in the decoding process regarding luminance component and in the decoding process regarding chrominance component (Step S1003).

For example, when the input data is a picture header or slice header, a macroblock mode in data included in a macroblock, or the like, the parameter calculation unit 901 determines that the input data is to be used as common data required both in the decoding process regarding luminance component and in the decoding process regarding chrominance component (Yes at Step S1003). If so, then the parameter calculation unit 901 provides the input data to the separation unit 302 (Step S1002), and the parameter calculation is completed.

When the input data is not to be used both in the decoding process regarding luminance component and in the decoding process regarding chrominance component (for example, if the input data is a motion vector), the parameter calculation unit 901 determines that the input data is not to be used as common data required both in the decoding process regarding luminance component and in the decoding process regarding chrominance component (No at Step S1003), then the processing proceeds to Step S1004.

Then, the parameter calculation unit 901 calculates data required in the decoding process regarding chrominance component, using data required in the decoding process regarding luminance component (Step S1004).

After completing the calculation of data required in the decoding process regarding luminance component and data required in the decoding process regarding chrominance component, the parameter calculation unit 901 outputs these pieces of data (Step S1002) and the parameter calculation is completed.

As described above, if, among the common data required both in the decoding process regarding luminance component and in the decoding process regarding chrominance component, there is a piece of data for which (a) data required in the decoding process regarding luminance component is to be calculated from data included in the coded bitstream and (b) data required in the decoding process regarding chrominance component is to be calculated from the data required in the decoding process regarding luminance component, the parameter calculation unit 901 in the stream separation unit 801 previously performs the calculation. Then, the parameter calculation unit 901 provides the calculated data required in the decoding process regarding luminance component and data required in the decoding process regarding chrominance component to the separation unit 302. Then, the stream separation unit 302 provides (a) the data required in the decoding process regarding luminance component to the luminance image reconstruction unit 202, and provides (b) the data required in the decoding process regarding chrominance component to the chrominance image reconstruction unit 802. Thereby, the processing which overlap between the luminance image reconstruction unit 202 and the chrominance image reconstruction unit 802 can be performed at once at a previous stage. As a result, efficiency of the processing can be enhanced.

Here, when input data of the parameter calculation unit 901 is data for which (a) data required in the decoding process regarding luminance component is to be calculated from data included in the coded bitstream and (b) data required in the decoding process regarding chrominance component is to be calculated from the data required in the decoding process regarding luminance component, the parameter calculation unit 901 previously calculates (b) the data required in the decoding process regarding chrominance component using (a) the data required in the decoding process regarding luminance component, as described above.

However, when an amount of the data required in the decoding process regarding chrominance component which is to be calculated using the data required in the decoding process regarding luminance component is significantly large in a coding standard for the coded bitstream to be decoded, if the parameter calculation unit 901 performs the entire calculation processing, it is necessary to have a huge amount of a memory region not only for processing the data required in the decoding process regarding luminance component, but also for holding or exchanging all of the data required in the decoding process regarding chrominance component.

Therefore, it is also possible that the parameter calculation unit 901 selects which data to be calculated among pieces of data required in the decoding process regarding chrominance component, and does not perform the above-described calculation for data having a large amount. Or, it is further possible that the separation unit 302 provides the data to the luminance image reconstruction unit 202 and the chrominance image reconstruction unit 802, and the chrominance image reconstruction unit 802 calculates some of data, for example, data required in the decoding process regarding chrominance component using data required in the decoding process regarding luminance component. As a result, a capacity of the memory region can be reduced.

Furthermore, it has been described as one example that the parameter calculation unit 901 calculates data required in the decoding process regarding chrominance component using data required in the decoding process regarding luminance component. However, if a method of calculating data required in the decoding process regarding luminance component from data required in the decoding process regarding chrominance component is defined, the parameter calculation unit 901 may calculate data required in the decoding process regarding luminance component from the data required in the decoding process regarding chrominance component.

Third Embodiment

It has been described in the first and second embodiments that the decoding device 10 performs decoding processes in parallel by separating color components of a coded bitstream to a luminance component and a chrominance component. In the meanwhile, in coding standards such as MPEG-2, chrominance is commonly further classified into chrominance Cb and Chrominance Cr.

A relationship between a chrominance format and a processing amount is described using three chrominance format examples of 4:2:0, 4:2:2, and 4:4:4.

Figure 15:
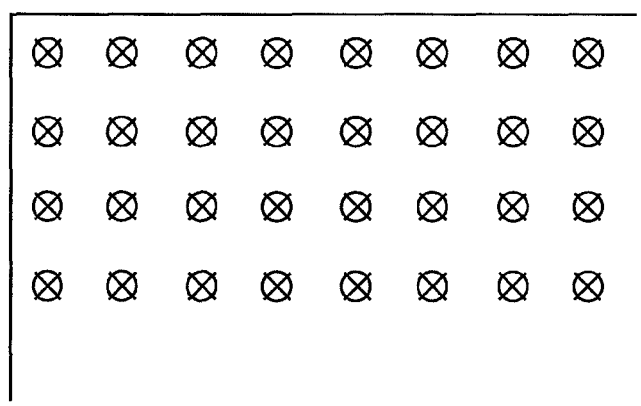
FIG. 15 is a diagram showing positions of luminance and chrominance samples when a chrominance format is 4:4:4.

FIGS. 13 to 15 are diagrams each showing positions of pixels of luminance (hereinafter, referred to also as "luminance samples") and pixels of chrominance (hereinafter, referred to also as "chrominance samples"), when chrominance formats are 4:2:0, 4:2:2, and 4:4:4, respectively.

In the case of the chrominance format 4:2:0, luminance samples and chrominance samples are positioned as shown in FIG. 13. The number of the chrominance samples is a half of the number of the luminance samples, both in a horizontal direction and in a vertical direction. In an entire picture, each of the number of chrominance samples Cb and the number of chrominance samples Cr is one fourth of the number of the luminance samples. Therefore, the number of the chrominance samples is a half of the number of the luminance samples. As a result, a processing amount regarding chrominance component is a half of a processing amount regarding luminance component.

In the case of the chrominance format 4:2:2, luminance samples and chrominance samples are positioned as shown in FIG. 14. The number of the chrominance samples is a half of the number of the luminance samples in a horizontal direction. In an entire picture, each of the number of chrominance samples Cb and the number of chrominance samples Cr is a half of the number of the luminance samples. As a result, a processing amount regarding chrominance component is equal to a processing amount regarding luminance component.

In the case of the chrominance format 4:4:4, luminance samples and chrominance samples are positioned as shown in FIG. 15. In an entire picture, each of the number of chrominance samples Cb and the number of chrominance samples Cr is equal to the number of the luminance samples. As a result, a processing amount regarding chrominance component is twice as much as a processing amount regarding luminance component.

Thereby, if a chrominance format of an input bitstream is 4:2:0 or 4:2:2, processing amounts can be sufficiently distributed by separating color components to two types of luminance and chrominance, not by separating the color components to three types of luminance, chrominance Cb, and chrominance Cr.

However, if a chrominance format of an input bitstream is 4:4:4 and color components of the input bitstream is separated to two types of luminance and chrominance, a processing amount regarding chrominance component is twice as much as a processing amount regarding luminance component. In this case, the processing amounts can be efficiently distributed when chrominance is further separated into chrominance Cb and chrominance Cr.

Therefore, if a coded bitstream having various chrominance formats is expected to be provided to the decoding device 10, it is demanded to change a method (separation method) of separating color components of the coded bitstream to a predetermined number of color components based on a chrominance format of the coded bitstream. For example, based on a chrominance format of the coded bitstream, color components of the coded bitstream are separated, in other words, classified, not only to two types which are luminance and chrominance, but also to three types which are luminance, chrominance Cb, and chrominance Cr.

The third embodiment provides a decoding device satisfying the above demand.

Figure 16:
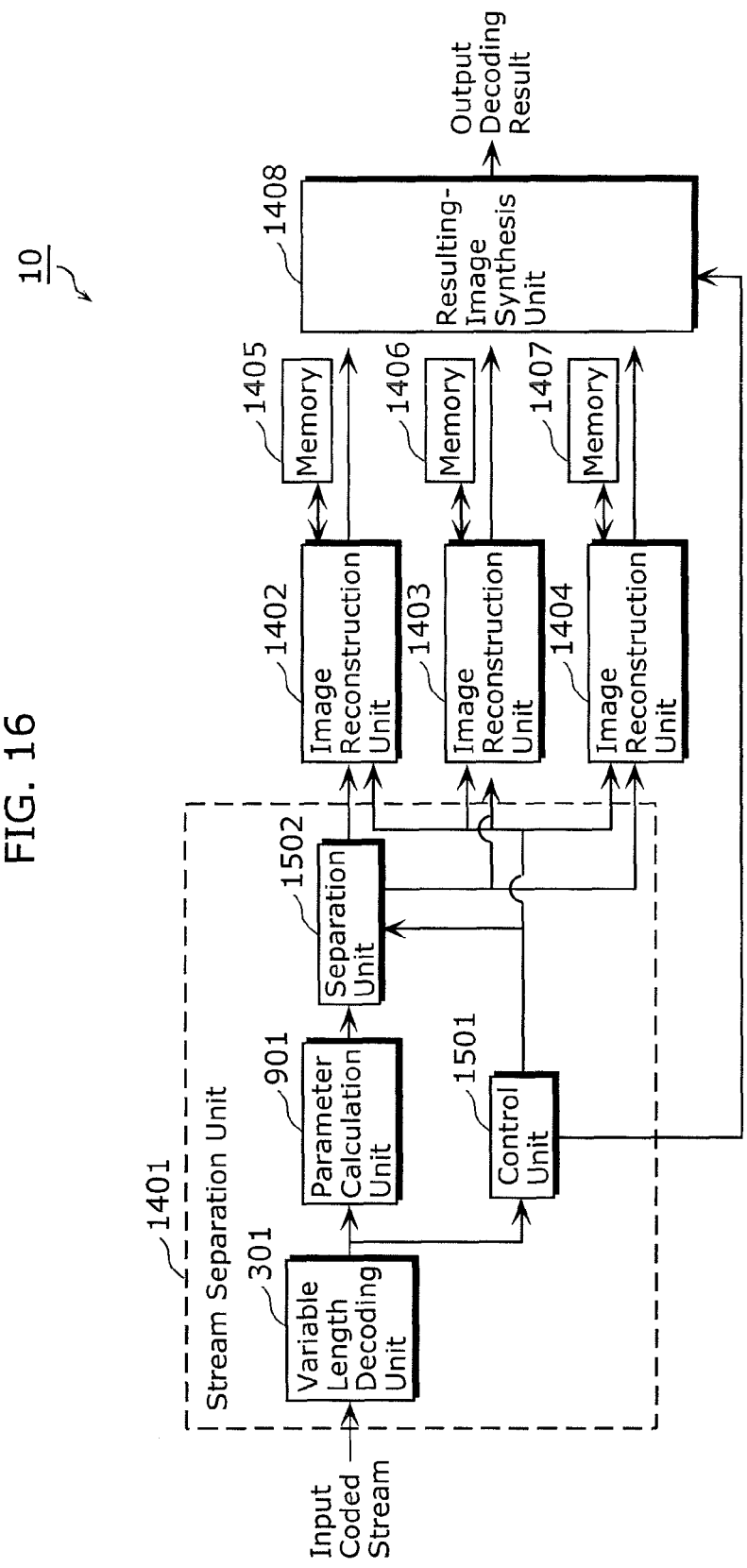
FIG. 16 is a block diagram showing an example of a decoding device according to a third embodiment of the present invention.

FIG. 16 is a block diagram showing an example of the decoding device 10 according to the third embodiment of the present invention.

The decoding device 10 according to the third embodiment performs decoding processes according to MPEG-2. As shown in FIG. 16, the decoding device 10 according to the third embodiment includes a stream separation unit 1401, image reconstruction units 1402, 1403, and 1404, memories 1405, 1406, and 1407, and a resulting-image synthesis unit 1408. The following describes processing performed by the decoding device 10 according to the third embodiment with reference to FIG. 16.

First, the stream separation unit 1401 performs variable length decoding on an input coded bitstream to generate variable length decoded data. Then, the stream separation unit 1401 decides a separation method for decoding processes, based on a chrominance format obtained by the variable length decoding.

If the chrominance format of the input coded bitstream is 4:2:0 or 4:2:2, the stream separation unit 1401 (i) decides a separation method of separating color components of the input coded stream to two types of luminance and chrominance, and (ii) separates the variable length decoded data according to the separation method.

Then, the stream separation unit 1401 outputs signals to instruct the image reconstruction unit 1402 at a following state to perform a decoding process to generate a decoded image regarding luminance component; instruct the image reconstruction unit 1403 at the following state to perform a decoding process to generate a decoded image regarding chrominance component; and instruct the image reconstruction unit 1404 at the following state not to perform any decoding process.

In addition, the stream separation unit 1401 outputs signals to the resulting-image synthesis unit 1408 to instruct the resulting-image synthesis unit 1408 to synthesize the decoded image regarding luminance component with the decoded image regarding chrominance component so as to output the resulting decoded image.

If the chrominance format of the input coded bitstream is 4:4:4, the stream separation unit 1401 (i) decides a separation method of separating color components of the input coded stream to luminance, chrominance Cb, and chrominance Cr, and (ii) separates the variable length decoded data according to the separation method.

Then, the stream separation unit 1401 outputs signals to instruct the image reconstruction unit 1402 at the following state to perform a decoding process to generate a decoded image regarding luminance component; instruct the image reconstruction unit 1403 at the following state to perform a decoding process to generate a decoded image regarding chrominance component Cb; and instruct the image reconstruction unit 1404 at the following state to perform a decoding process to generate a decoded image regarding chrominance component Cr.

In addition, the stream separation unit 1401 outputs signals to the resulting-image synthesis unit 1408 to instruct the resulting-image synthesis unit 1408 to synthesize the decoded images regarding luminance component, chrominance Cb, and chrominance Cr together so as to output the resulting decoded image.

Each of the image reconstruction units 1402, 1403, and 1404 has the same structure to generate a decoded image regarding a corresponding color component in the predetermined number of color components, according to the separation method decided by the stream separation unit 1401. More specifically, based on the control signals provided from the stream separation unit 1401, each of the image reconstruction units 1402, 1403, and 1404 sets a decoding process among the decoding processes regarding luminance component, chrominance, chrominance Cb, and chrominance Cr. Then, each image reconstruction unit processes received pieces of data required in the set decoding process which are provided from the stream separation unit 1401, thereby generating a decoded image.

The decoded images generated by the image reconstruction units 1402, 1403, and 1404 are provided to the resulting-image synthesis unit 1408. In addition, since each of the decoded images is used in a corresponding one of the image reconstruction units 1402, 1403, and 1404, as a reference image in motion compensation for decoding a subsequent picture, the decoded image is stored in a corresponding one of the memories 1405, 1406, and 1407.

According to the separation method decided by the stream separation unit 1401, the resulting-image synthesis unit 1408 synthesizes the decoded images regarding the predetermined number of color components which are generated by the image reconstruction units 1402, 1403, and 1404, in order to generate a resulting decoded image of the coded image data. In more detail, the resulting-image synthesis unit 1408 synthesizes the decoded results of the image reconstruction units 1402, 1403, and 1404 together, based on the control signals provided from the stream separation unit 1401, and thereby generates a resulting decoded image.

Next, the processing performed by the stream separation unit 1401 is described in more detail. Here, the same reference numerals of FIG. 3 according to the first embodiment and of FIG. 10 according to the second embodiment are assigned to the identical units of FIG. 16 performing the same processing, so that the identical units are not explained again below.

The stream separation unit 1401 includes the variable length decoding unit 301, the parameter calculation unit 901, a control unit 1501, and a separation unit 1502.

The control unit 1501 decides a separation method of separating (classifying) color components of an input coded bitstream to a predetermined number of color components based on a chrominance format of the coded bitstream. More specifically, when the number of pixels regarding a fourth color component is larger than the number of pixels regarding a third color component in the predetermined number of color components of the input coded bitstream, the control unit 1501 decides the separation method by which the fourth color component is separated into color components that are more than the third color component.

More specifically, the control unit 1501 receives the variable length decoded data generated by the variable length decoding unit 301 and decides a separation method for decoding processes based on a chrominance format included in the received data. Then, according to the decided separation method, the control unit 1501 outputs signals (control signals) for controlling the separation unit 1502 at the following stage how to perform separation processing. In addition, the control unit 1501 outputs control signals to each of the image reconstruction units 1402, 1403, and 1404 to instruct for which color component the image reconstruction unit performs a decoding process.

The separation unit 1502 separates (classifies), according to the separation method decided by the control unit 1501, color components in an input decoded image data to a predetermined number of color components, and obtains data required in each of decoding processes regarding the predetermined number of color components. More specifically, the separation unit 1502 separates data provided from the parameter calculation unit 901 to pieces of the data required in each of the decoding processes, in other words, determines each of to-be-decoded data of the provided data as being at least one of the data required in the decoding processes. In addition, the separation unit 1502 provides each of the pieces of data to a corresponding one of the image reconstruction units 1402, 1403, and 1404. The control unit 1501 controls the separation unit 1502 how to provide the pieces of data to the image reconstruction units.

Moreover, the separation unit 1502 performs the separation processing according to two modes presented below. The separation unit 1502 switches between the modes based on control signals received from the control unit 1501.

a mode at which the separation unit 1502 (i) separates received data to two types of (a) pieces of data required in a decoding process regarding luminance component and (b) pieces of data required in a decoding process regarding chrominance component, in other words, determines each of to-be-decoded pieces of the received data as being at least one of (a) and (b), and (ii) provides (a) the pieces of data required in the decoding process regarding luminance component to the image reconstruction unit 1402, and (b) the pieces of data required in the decoding process regarding chrominance component to the image reconstruction unit 1403.

a mode at which the separation unit 1502 (i) separates received data to three types of (a) pieces of data required in a decoding process regarding luminance component, (b1) pieces of data required in a decoding process regarding chrominance component Cb, and (b2) pieces of data required in a decoding process regarding chrominance component Cr, In other words, determines each of to-be-decoded pieces of the received data as being at least one of (a), (b1), and (b2), and (ii) provides (a) the pieces of data required in the decoding process regarding luminance component to the image reconstruction unit 1402, (b1) the pieces of data required in the decoding process regarding chrominance component Cb to the image reconstruction unit 1403, and (b2) the pieces of data required in the decoding process regarding chrominance component Cr to the image reconstruction unit 1404.

Figure 17:
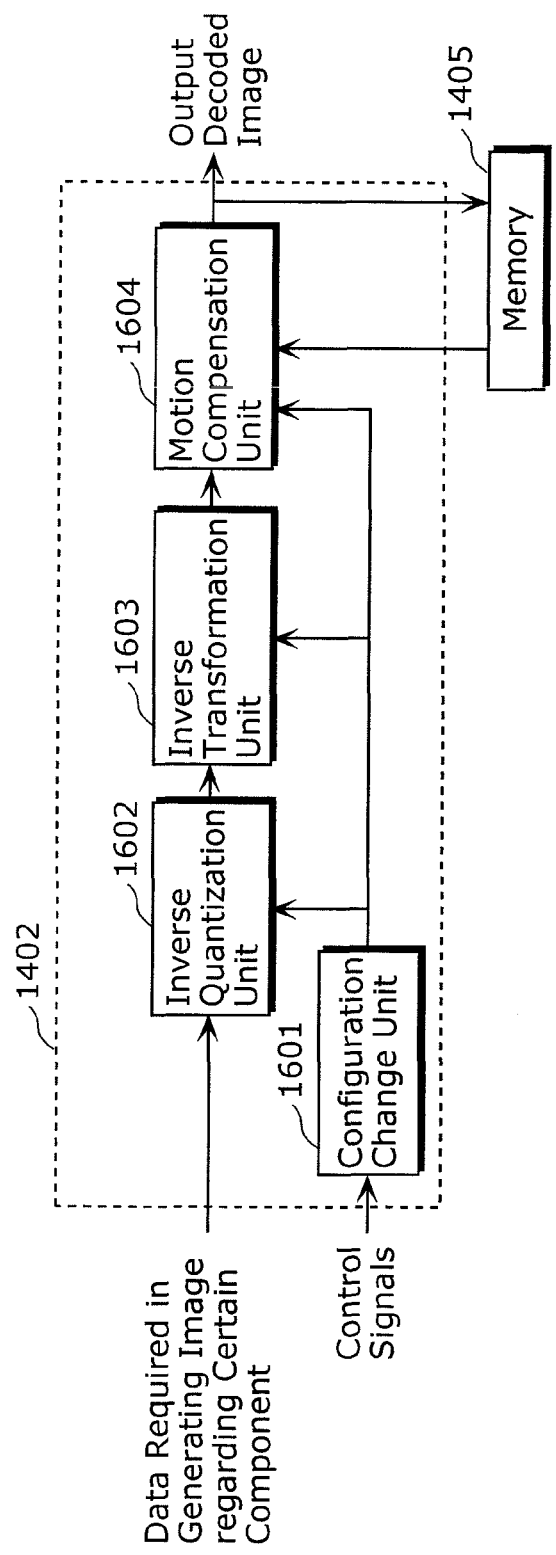
FIG. 17 is a block diagram showing an example of an image reconstruction unit in the decoding device according to the third embodiment of the present invention.

Next, a structure of each of the image reconstruction units 1402, 1043, and 1404 is described with reference to a block diagram of FIG. 17. FIG. 17 is a block diagram showing an example of any one of the image reconstruction units 1402, 1403, and 1404 in the decoding device 10 according to the third embodiment of the present invention. Here, since the image reconstruction units 1402, 1403, and 1404 have the same structure, only a structure of the image reconstruction unit 1402 is explained as a representative.

As shown in FIG. 17, the image reconstruction unit 1402 includes a configuration change unit 1601, an inverse quantization unit 1602, an inverse transformation unit 1603, and a motion compensation unit 1604. The image reconstruction unit 1401 provides a resulting reconstructed image to the memory 1405, and later uses the image as a reference image in motion compensation for a subsequent picture to be reconstructed.

An input of the image reconstruction unit 1402 is not an MPEG-2 coded bitstream itself, but only data required in a decoding process regarding a specific color component among luminance, chrominance, chrominance Cb, and chrominance Cr, which is obtained from variable length decoded image of the MPEG-2 coded bitstream. Therefore, as with the luminance image reconstruction unit 202 in the first embodiment, the image reconstruction unit 1402 does not need a function equivalent to the variable length decoding unit 502 in the general MPEG-2 decoder 501.

The configuration change unit 1601 (i) obtains, from the control unit 1501, information that indicates, among the predetermined number of color component, a color component of the data required in a decoding process which is provided to the image reconstruction unit 1402 and (ii) outputs an instruction signal to other units in the image reconstruction unit 1402 to generate a decoded image regarding the color component indicated in the information using the provided data.

In other word, an input of the configuration change unit 1601 is control signals provided from the control unit 1501 in the stream separation unit 1401. Then, based on the control signals, the configuration change unit 1601 determines which data among (a) data required in a decoding process regarding luminance component, (b) data required in a decoding process regarding chrominance component, (b1) data required in a decoding process regarding chrominance component Cb, and (b2) data required in a decoding process regarding chrominance component Cr, input data is. Then, the configuration change unit 1601 provides signals to the inverse quantization unit 1602, the inverse transformation unit 1603, and the motion compensation unit 1604, respectively, in order to change configuration of each unit to perform only a process regarding the color component of the input data.

Based on the signals from the configuration change unit 1601, the inverse quantization unit 1602 performs inverse quantization on the data required in a decoding process, which is received from the stream separation unit 1401, regarding the specific color component, namely, the color component of the input necessary data, among luminance, chrominance, chrominance Cb, and chrominance Cr. Then, the inverse quantization unit 1602 provides the result to the inverse transformation unit 1603.

Based on the signals from the configuration change unit 1601, the inverse transformation unit 1603 performs inverse discrete cosine transformation on the data received from the inverse quantization unit 1602, regarding the specific color component among luminance, chrominance, chrominance Cb, and chrominance Cr. Then, the inverse transformation unit 1603 provides the result to the motion compensation unit 1604.

Based on the signals from the configuration change unit 1601, the motion compensation unit 1604 performs motion compensation on the data received from the inverse transformation unit 1603 with reference to a reference image stored in the memory 1405, regarding the specific color component among luminance, chrominance, chrominance Cb, and chrominance Cr, thereby generating and outputting a resulting decoded image. In addition, the motion compensation unit 1604 writes, in the memory 1405, the resulting decoded image which is to be used as a reference image in motion compensation for decoding a subsequent picture.

Next, the decoding processing performed by the decoding device 10 according to the third embodiment is described. Here, the decoding processing according to the third embodiment is basically the same as the decoding processing according to the second embodiment shown in FIG. 11. However, the decoding processing according to the third embodiment differs from the decoding processing according to the second embodiment in the luminance/chrominance separation processing (Step S206 in FIG. 11). Therefore, the following describes the details of the luminance/chrominance separation processing (Step S206 in FIG. 11) performed by the separation unit 1502 with reference to flowcharts of FIGS. 18 and 19.

Figure 18:
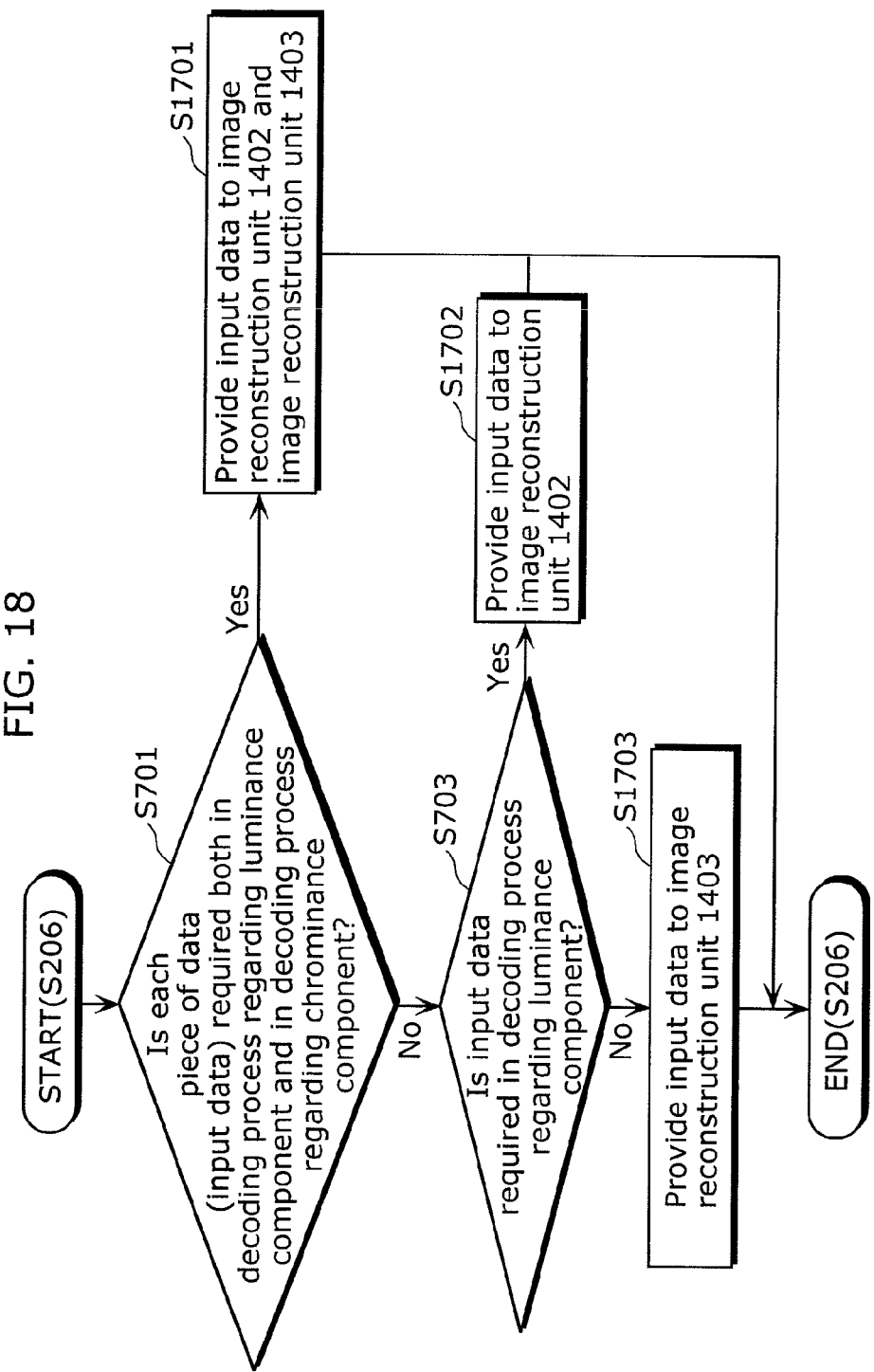
FIG. 18 is a flowchart of processing for separation of input data into two types which are (a) data regarding luminance component and (b) data regarding chrominance component in luminance/chrominance separation processing performed by the decoding device according to the third embodiment of the present invention.

FIG. 18 is a flowchart of processing for separation of input data into two types which are (a) data regarding luminance component and (b) data regarding chrominance component in the luminance/chrominance separation processing performed by the decoding device 10 according to the third embodiment of the present invention.

Figure 19:
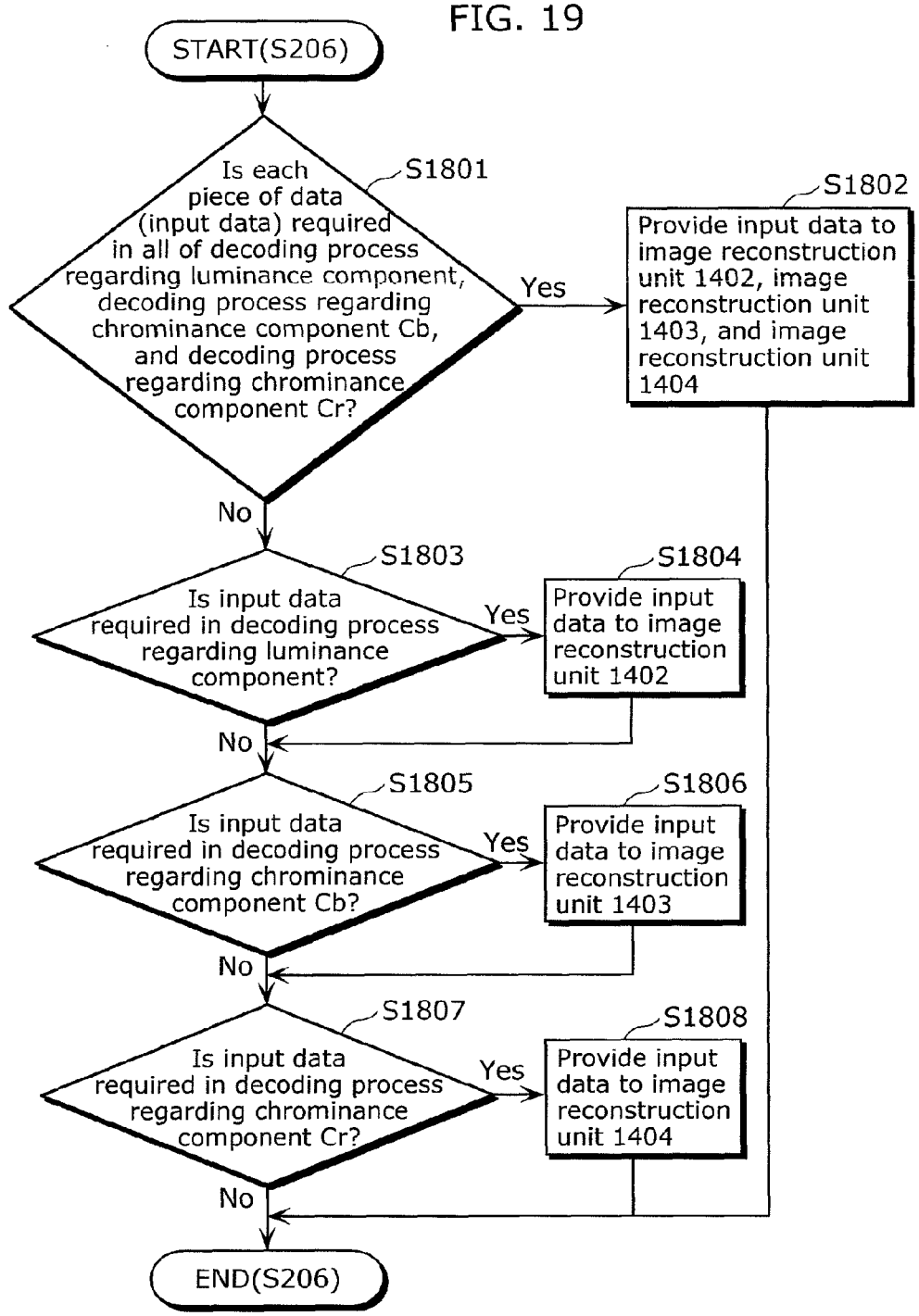
FIG. 19 is a flowchart of processing for separation of input data into three types which are (a) data regarding luminance component, (b1) data regarding chrominance component Cb, and (b2) data regarding chrominance component Cr in the luminance/chrominance separation processing performed by the decoding device according to the third embodiment of the present invention.

FIG. 19 is a flowchart of processing for separation of input data into three types which are (a) data regarding luminance component, (b1) data regarding chrominance component Cb, and (b2) data regarding chrominance component Cr in the luminance/chrominance separation processing performed by the decoding device 10 according to the third embodiment of the present invention.

In the luminance/chrominance separation processing performed by the separation unit 1502, the separation unit 1502 switches between (i) separation (classification) to luminance and chrominance and (ii) separation (classification) to luminance, chrominance Cb, and chrominance Cr, based on the control signals from the control unit 1501. FIG. 18 explains the luminance/chrominance separation processing according to (i) the separation to luminance and chrominance. FIG. 19 explains the luminance/chrominance separation processing according to (ii) the separation to luminance, chrominance Cb, and chrominance Cr.

First, the luminance/chrominance separation processing according to (i) the separation to luminance and chrominance is explained with reference to FIG. 18. Here, regarding separating into pieces of data regarding luminance component and pieces of data regarding chrominance component, in other words, regarding determining of each of the pieces of the data as being at least one of data regarding luminance component and data regarding chrominance component, the same steps in the flowchart of the luminance/chrominance separation processing of FIG. 8 according to the first embodiment are assigned to the identical steps in FIG. 18, so that the identical steps are not explained again below.

If the separation unit 1502 determines, at Step S701, that input data (each of to-be-decoded piece of the variable length decoded data) is required both in the decoding process regarding luminance component and in the decoding process regarding chrominance component (Yes at Step S701), then the separation unit 1502 provides the input data both to the image reconstruction unit 1402 that reconstructs image regarding luminance component, namely, performs the decoding process regarding luminance component, and the image reconstruction unit 1403 that reconstructs image regarding chrominance component, namely, performs the decoding process regarding chrominance component (Step S1701).

If the separation unit 1502 determines, at Step S701, that the input data is not required in the decoding process regarding luminance component or not required in the decoding process regarding chrominance component (No at Step S701), then the separation unit 1502 further determines whether or not the input data is required in the decoding process regarding luminance component (Step S703).

If the separation unit 1502 determines that the input data is required in the decoding process regarding luminance component (Yes at Step S703), then the separation unit 1502 provides the input data to the image reconstruction unit 1402 (Step S1702).

On the other hand, if the separation unit 1502 determines that the input data is not required in the decoding process regarding luminance component (No at Step S703), then the separation unit 1502 determines that the input data is required only in the decoding process regarding chrominance component and provides the input data to the image reconstruction unit 1403 (Step S1703).

Next, the luminance/chrominance separation processing according to (ii) the separation to luminance, chrominance Cb, and chrominance Cr is explained with reference to FIG. 19.

The separation unit 1502 determines whether or not the input data, namely, each of pieces of the data, received from the variable length decoding unit 301 is required in all of the decoding process regarding luminance component, the decoding process regarding chrominance component Cb, and the decoding process regarding chrominance component Cr (Step S1801).

If the separation unit 1502 determines that the input data is required in all of these decoding processes (Yes at Step S1801), then the separation unit 1502 provides the input data to: the image reconstruction unit 1402 that performs the decoding process regarding luminance component; the image reconstruction unit 1403 that performs the decoding process regarding chrominance component Cb; and the image reconstruction unit 1403 that performs the decoding process regarding chrominance component Cr (Step S1802), and the luminance/chrominance separation processing is completed.

If the separation unit 1502 determines that the input data is not required in all of the three decoding processes (No at Step S1801), then the separation unit 1502 further determines whether or not the input data is required in the decoding process regarding luminance component (Step S1803).

If the separation unit 1502 determines that the input data is required in the decoding process regarding luminance component (Yes at Step S1803), then the separation unit 1502 provides the input data to the image reconstruction unit 1402 (Step S1804), and the processing proceeds to Step S1805.

On the other hand, if the separation unit 1502 determines that the input data is not required in the decoding process regarding luminance component (No at Step S1803), then the separation unit 1502 does not provide the input data to anywhere, and the processing proceeds to Step S1805.

Next, the separation unit 1502 determines whether or not the input data is required in the decoding process regarding chrominance component Cb (Step S1805).

If the separation unit 1502 determines that the input data is required in the decoding process regarding chrominance component Cb (Yes at Step S1805), then the separation unit 1502 provides the input data to the image reconstruction unit 1403 (Step S1806), and the processing proceeds to Step S1807.

On the other hand, if the separation unit 1502 determines that the input data is not required in the decoding process regarding chrominance component Cb (No at Step S1805), then the separation unit 1502 does not provide the input data to anywhere, and the processing proceeds to Step S1807.

Next, the separation unit 1502 determines whether or not the input data is required in the decoding process regarding chrominance component Cr (Step S1807).

If the separation unit 1502 determines that the input data is required in the decoding process regarding chrominance component Cr (Yes at Step S1807), then the separation unit 1502 provides the input data to the image reconstruction unit 1404 (Step S1808), and the luminance/chrominance separation processing is completed.

On the other hand, if the separation unit 1502 determines that the input data is not required in the decoding process regarding chrominance component Cr (No at Step S1807), then the luminance/chrominance separation processing is completed.

As described above, in the case of decoding a coded bitstream having a chrominance format 4:4:4 in which the number of the chrominance samples is twice as much as the number of the luminance samples, chrominance is further separated to chrominance Cb and chrominance Cr. Thereby, data regarding luminance component, data regarding chrominance component Cb, and data regarding chrominance component Cr are decoded in parallel. As a result, a processing amount is substantially equal among the image reconstruction units 1402, 1403, and 1404, which makes it possible to perform the parallel processing efficiently.

In addition, in a chrominance format of 4:2:2 or 4:2:0, in which the number of chrominance samples is less than the number of luminance samples, a calculation amount for decoding the data regarding the chrominance is less than a calculation amount for decoding the data regarding luminance component. Therefore, when color components are separated (classified) not to luminance, chrominance Cb, and chrominance Cr, but to two types which are luminance and chrominance in order to decode data, it is possible to reduce resources for calculation executed in parallel processing.

Moreover, based on control signals from the control unit 1501 in the stream separation unit 1401, each of the image reconstruction units 1402, 1403, and 1404 can change its configuration to decode one of data regarding luminance component, data regarding chrominance component, data regarding chrominance component Cb, and data regarding chrominance component Cr. Thereby, it is possible to flexibly control these image reconstruction units to perform the processing depending on a chrominance format of an input stream. As a result, in comparison with a structure having a decoder dedicated only to a decoding process regarding a specific color component, the decoding device 10 according to the third embodiment can efficiently use calculation resources, and efficiently perform decoding processes in parallel.

It should be noted that it has been described in the third embodiment that any input stream is separated into pieces of data regarding luminance component and pieces of data regarding chrominance component, or into pieces of data regarding luminance component, pieces of data regarding chrominance component Cb, and pieces of data regarding chrominance component Cr. However, if a calculation amount for a coded bitstream to be decoded is small (for example, an image is small), it is also possible to decode both of data regarding luminance component and data regarding chrominance component by the same image reconstruction unit 1402.

Here, each of the parameter calculation unit 901 and the separation unit 1502 passes input data through to the next stage without performing any processing on the input data, and the control unit 1501 provides control signals to control the separation unit 1502 to pass the input data without performing any processing on the input data. In addition, the control unit 1501 provides signals to the image reconstruction unit 1402 in order to control the image reconstruction unit 1402 to decode both data regarding luminance component and data regarding chrominance component.

Thereby, parallel processing is not performed for a small image because such a small image does not have merits from the parallel processing. When data of such a small image is decoded by a single image reconstruction unit, there are advantages of reduction in calculation resources for a decoding process and efficiency in the decoding process.

It should also be noted that it has been described in the third embodiment that, when input data is separated into two types which are data regarding luminance component and data regarding chrominance component, the image reconstruction unit 1402 decodes the data regarding luminance component and the image reconstruction unit 1403 decodes the data regarding chrominance component. However, since the image reconstruction units 1402, 1403, and 1404 have the same structure, the allocation of the image reconstruction units is not limited to the above. Also in the situation where input data is separated into three types which are data regarding luminance component, data regarding chrominance component Cb, and data regarding chrominance component Cr, the allocation of the image reconstruction units, namely, how to allocate respective decoding processes to the image reconstruction units, is not limited only to that described in the third embodiment.

It should also be noted that it has been described in the third embodiment that the control unit 1501 in the stream separation unit 1401 provides signals to the resulting-image synthesis unit 1408 to control the resulting-image synthesis unit 1408 to synthesize a decoded image regarding luminance component and a decoded image regarding chrominance component together, and that the resulting-image synthesis unit 1408 synthesizes these images together based on the signals. However, it is also possible that the signals are provided from the image reconstruction units 1402, 1403, and 1404, and the resulting-image synthesis unit 1408 performs the synthesis based on the signals.

Fourth Embodiment

In the first to third embodiments, it has been described that the decoding device 10 performs variable length decoding on an input coded bitstream, then separates the variable length decoded data based on a plurality of color components, and eventually decodes each of the data regarding a corresponding color component. In the fourth embodiment, however, a decoding device previously divides an input coded bitstream into regions, then performs variable length decoding on each of the regions, then separates each variable length decoded data based on a plurality of color component, and eventually decodes each of the separated data regarding a corresponding color component.

Figure 20:
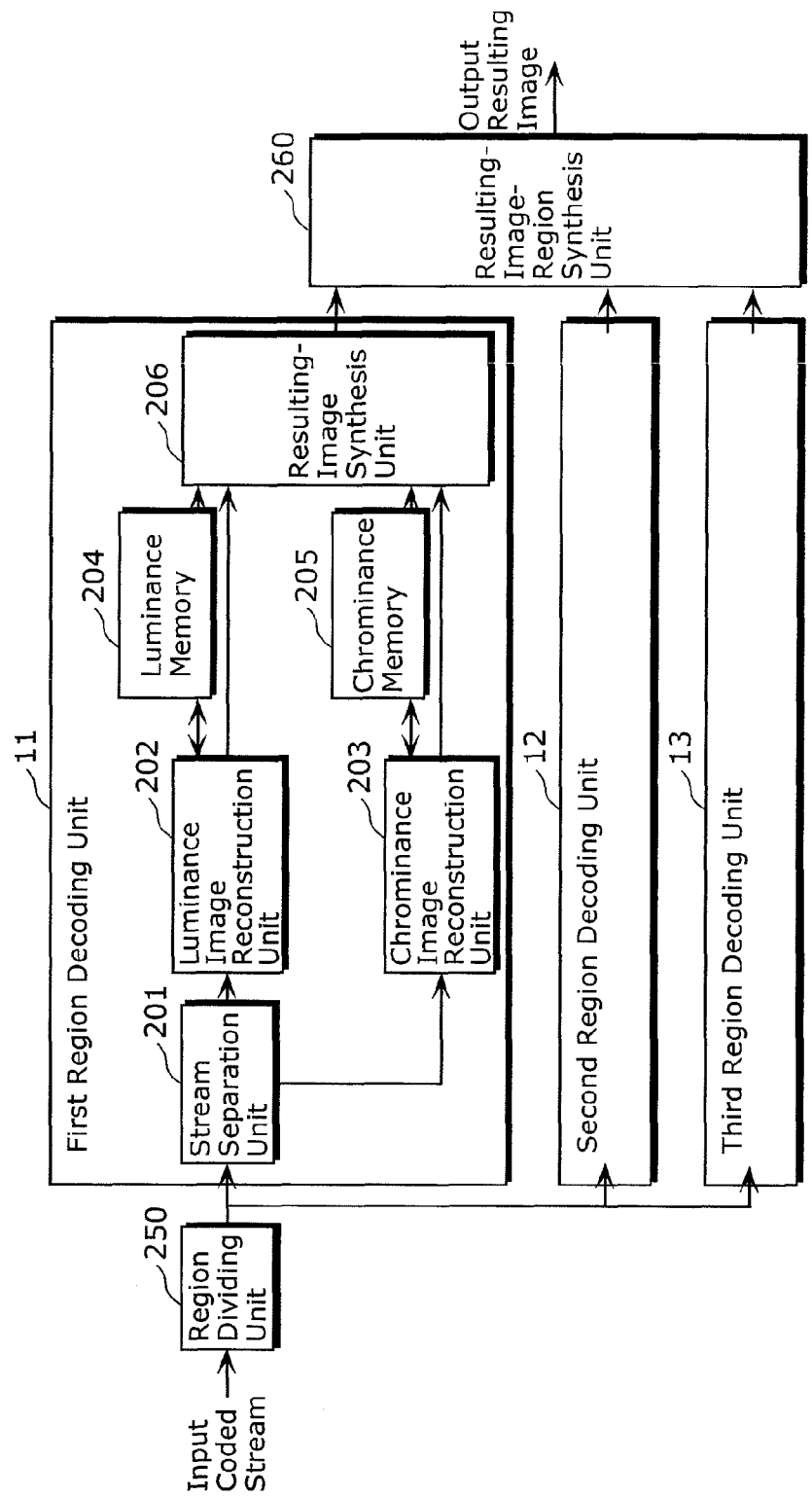
FIG. 20 is a block diagram showing an example of a decoding device according to a fourth embodiment of the present invention.

FIG. 20 is a block diagram showing an example of the decoding device 10 according to the fourth embodiment of the present invention.

As shown in FIG. 20, the decoding device 10 according to the fourth embodiment includes a region dividing unit 250, a first region decoding unit 11, a second region decoding unit 12, a third region decoding unit 13, and a resulting-image-region synthesis unit 260.

The region dividing unit 250 divides a region of a coded image data into a plurality of regions. In more detail, the region dividing unit 250 divides a region of a coded bitstream into three regions which are a first region, a second region, and a third region.

Each of the first region decoding unit 11, the second region decoding unit 12, and the third region decoding unit 13 performs (i) the variable length decoding, (ii) the separating based on a plurality of color components, and (iii) the decoding processes, for the corresponding region divided by the region dividing unit 250.

For example, the first region decoding unit 11 performs variable length decoding on the first region, then separates the resulting variable length decoded data into pieces based on a plurality of color components, in other words, determines each of to-be-decoded pieces of the resulting variable length decoded data as being at least one of data regarding the plurality of color components, and decodes the pieces. Here, the first region decoding unit 11 has the same structure as that of the decoding device 10 according to the first embodiment shown in FIG. 2. Therefore, the structure of the first region decoding unit 11 is not explained in detail below.

Likewise, the second region decoding unit 12 performs variable length decoding on the second region, then separates the resulting variable length decoded data into pieces based on a plurality of color components, and decodes the pieces. The third region decoding unit 13 performs variable length decoding on the third region, then separates the resulting variable length decoded data into pieces based on a plurality of color components, and decodes the pieces. Here, each of the second region decoding unit 12 and the third region decoding unit 13 has the same structure as that of the first region decoding unit 11, and therefore their structures are not explained in detail below.

The resulting-image-region synthesis unit 260 synthesizes respective decoded images generated by the first region decoding unit 11, the second region decoding unit 12, and the third region decoding unit 13, together, thereby generating a resulting decoded image of the coded image data.

More specifically, the resulting-image-region synthesis unit 260 synthesizes: a resulting decoded image of the resulting-image synthesis unit 206 in the first region synthesis unit 11; a resulting decoded image of the resulting-image synthesis unit 206 in the second region decoding unit 12; a resulting decoded image of the resulting-image synthesis unit 206 in the third region decoding unit 13, thereby generating and outputting a resulting decoded image of the input coded bitstream.

With the above structure, even if an input coded bitstream has a huge amount of data, the decoding device 10 according to the fourth embodiment can reduce a processing amount in the decoding process performed by each image reconstruction unit.

Here, the region dividing unit 250 may divide input data into not only three regions, but also two or more than four regions. Then, the processing units performing the decoding processing are not limited to the three units of the first region decoding unit 11, the second region decoding unit 12, and the third region decoding unit 13. Two or more than four region decoding units may be employed depending on the number of regions separated by the region dividing unit 250.

Furthermore, the resulting-image-region synthesis unit 260 may generate a decoded image by synthesizing decoded images generated by the image reconstruction units of the first region decoding unit 11, the second region decoding unit 12, and the third region decoding unit 13, without using the resulting-image synthesis units 206 of these region decoding units.

Fifth Embodiment

In the fourth embodiment, it has been described that the decoding device 10 previously divides an input coded bitstream into regions, then performs variable length decoding on each of the regions, then separates each variable length decoded image based on a plurality of color components, and eventually decodes each of the separated data regarding a corresponding color component. In the fifth embodiment, however, a decoding device performs variable length decoding on an input coded bitstream, then separates the variable length decoded data based on a plurality of color components, then divides each of the separated data regarding a corresponding color component into regions, and eventually performs a decoding process for each of the regions.

Figure 21:
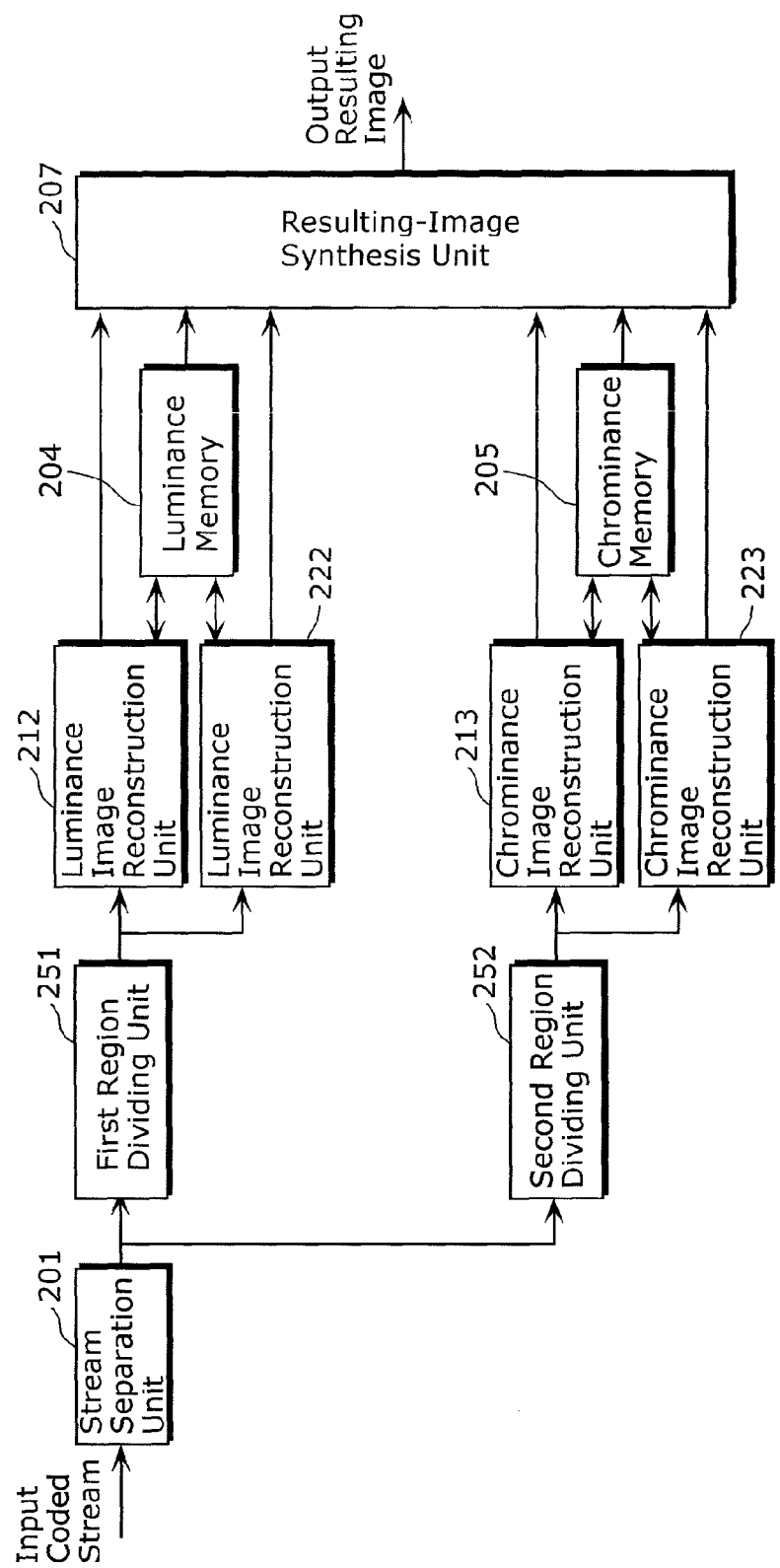
FIG. 21 is a block diagram showing an example of a decoding device according to a fifth embodiment of the present invention.

FIG. 21 is a block diagram showing an example of the decoding device according to the fifth embodiment of the present invention.

As shown in FIG. 21, the decoding device 10 according to the fifth embodiment includes the stream separation unit 201, a first region dividing unit 251, a second region dividing unit 252, luminance image reconstruction units 212 and 222, chrominance image reconstruction unit 213 and 223, the luminance memory 204, the chrominance memory 205, and a resulting-image synthesis unit 207.

Here, the stream separation unit 210, the luminance memory 204, and the chrominance memory 205 perform the same processes as those of the stream separation unit 201, the luminance memory 204, and the chrominance memory 205 in the first embodiment shown in FIG. 2, respectively. Therefore, the same processes are not explained again below.

Each of the first region dividing unit 251 and the second region dividing unit 252 divides a region regarding a corresponding one of the color components which are separated from the coded image data by the stream separation unit 201.

More specifically, the first region dividing unit 251 divides a region regarding luminance component in the input coded bitstream into two regions, and the second region dividing unit 252 divides a region regarding chrominance component in the input coded bitstream into two regions.

Each of the luminance image reconstruction units 212 and 222 and the chrominance image reconstruction units 213 and 223 generates a decoded image regarding data required in a decoding process regarding a corresponding one of the divided regions each of which corresponds to one the predetermined number of color components.

More specifically, regarding luminance component, each of the luminance image reconstruction units 212 and 222 generates a decoded image regarding a corresponding one of the two regions divided by the first region dividing unit 251, using data required in a decoding process regarding the corresponding region. Regarding chrominance component, each of the chrominance image reconstruction units 213 and 223 generates a decoded image regarding a corresponding one of the two regions divided by the second region dividing unit 252, using data required in a decoding process regarding the corresponding region.

Here, each of the luminance image reconstruction units 212 and 222 has the same structure as that of the luminance image reconstruction unit 202 in the first embodiment shown in FIG. 6. Therefore, the details of the structure are not explained again below. Likewise, each of the chrominance image reconstruction units 213 and 223 has the same structure as that of the chrominance image reconstruction unit 203 in the first embodiment. Therefore, the details of the structure are not explained again below.

It should be noted that each of the luminance image reconstruction unit 212, the luminance image reconstruction unit 222, the chrominance image reconstruction unit 213, and the chrominance image reconstruction unit 223 corresponds to the "image reconstruction unit" in the aspect of the present invention.

The resulting-image combining unit 207 synthesizes the respective decoded images generated by the luminance image reconstruction units 212 and 222 and the chrominance image reconstruction units 213 and 223, and thereby generates a resulting decoded image of the input coded bitstream.

With the above structure, the decoding device 10 according to the fifth embodiment divides a region of the input image into more regions for a color components having more pixels. Thereby, it is possible to average the processing amounts of the decoding processes performed by the respective image reconstruction units.

For example, in the case of a chrominance format of 4:2:0, the number of luminance samples is twice as much as the number of chrominance samples. Therefore, the second region dividing unit 252 does not divide a region regarding chrominance component, but the first region dividing unit 251 divides a region regarding luminance component into two regions. On the other hand, in the case of the chrominance format of 4:4:4, the number of the chrominance samples is twice as much as the number of the luminance samples. In this case, the first region dividing unit 251 does not divide a region regarding luminance component, but the second region dividing unit 252 divides a region regarding chrominance component into two regions. Thereby, it is possible to average the processing amounts of the decoding processes performed by the respective image reconstruction units.

It should be noted that each of the first region dividing unit 251 and the second region dividing unit 252 may divide a region not only into two regions, but also into three or more regions. In addition, the number of the processing units performing decoding processes regarding luminance component may be not only two (the luminance image reconstruction units 212 and 222), but may be three or more depending on how many regions the first region dividing unit 251 divides a region to. Likewise, the number of the processing units performing decoding processes regarding chrominance component may be not only two (the chrominance image reconstruction units 213 and 223), but may be three or more depending on how many regions the second region dividing unit 252 divides a region to.

It is also possible that the resulting-image combining unit 207 includes: a luminance data synthesis unit that synthesizes decoded images generated by the luminance image reconstruction units 212 and 222; and a chrominance data synthesis unit that synthesizes decoded images generated by the chrominance image reconstruction units 213 and 223, and that the resulting-image combining unit 207 synthesizes decoded images generated by the luminance data synthesis unit and the chrominance data synthesis unit to generate a resulting decoded image.

It should be noted that it has been described in the first to fifth embodiments that the coded bitstream to be decoded is coded according to MPEG-2 standard, but the coding standard in the present invention is not limited to MPEG-2 and may be any coding standard, as far as a picture has a plurality of components (for example, luminance, chrominance Cb, and chrominance Cr) and the coded bitstream is applied with variable length coding. For instance, the coded bitstream to be decoded may be coded according to MPEG-4, H.264, VC-1, Audio Video Coding Standard of China (AVS), or the like.

It should also be noted that it has been described in the first, second, fourth, and fifth embodiments that the input data is separated based on luminance and chrominance, or based on luminance, chrominance Cb, and chrominance Cr, but the input data may be separated based on other color components. For example, the input data may be separated based on color components of Red, Green, and Blue (RGB), or based on color components of Hue, Saturation, and Value (HSV).

It should also be noted that it has been described in the first to fifth embodiments that the respective functional blocks in the decoding device 10 are typically implemented as a program executed on an information technology device requiring a Central Processing Unit (CPU) and a memory. However, a part or all of the functions may be implemented into a Large-Scale Integration (LSI) which is an integrated circuit. These LSIs may be integrated separately, or a part or all of them may be integrated into a single chip. Here, the integrated circuit is referred to as a LSI, but the integrated circuit can be called an IC, a system LSI, a super LSI or an ultra LSI depending on their degrees of integration.

It should also be noted that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

The decoding device 10 according to the present invention can be used in various devices for decoding data coded according to video coding standards such as MPEG-2 and H.264. Examples of such devices are digital broadcasting receiving devices, mobile phones, optical reproduction devices such as Blu-ray Disc players and Digital Versatile Disc (DVD) players, and personal computers.

FIG. 22 is a block diagram showing an example in which the decoding device 10 according to the present invention is used in a digital broadcasting receiving device.

As shown in FIG. 22, the digital broadcasting receiving device 1901 that receives digital broadcasting includes a tuner module 1902, a stream decoder 1903, an audio decoder 1904, a Read-Only Memory (ROM) 1905, a CPU 1906, a Random Access Memory (RAM) 1907, an output control unit 1908, and a decoding device 1909. In FIG. 22, the decoding device 1909 is the decoding device 10 according to the third embodiment shown in FIG. 16. However, the decoding device 1909 may be any decoding device 10 according to the first to fifth embodiments.

The tuner module 1902 receives broadcast waves (radio frequency) and obtains digital data (coded bitstream) of a desired channel from the broadcast waves.

The stream decoder 1903 separates audio data and video data from the digital data (coded bitstream) of the desired channel, and performs other processing. The stream decoder 1903 corresponds to the "data separation unit" in the aspect of the present invention.

The audio decoder 1904 decodes the audio data.

The ROM 1905 holds programs and data.

The CPU 1906 controls the entire receiving device 1901.

The RAM 1907 is used as an image memory and a memory region for various data.

The output control unit 1908 performs synchronization, format conversion, and the like for the decoded video and the decoded audio. In addition, the output control unit 1908 outputs (i) the decoded video generated by the decoding device 1909 and (ii) the decoded audio, as video signals and audio signals.

In the above structure, the stream separation unit 1401, the image reconstruction units 1402, 1403, and 1404, and the resulting-image combining unit 1408 are implemented separately as different chips, and the memories 1405, 1406, and 1407 are implemented to be used as independent different devices.

However, regarding the technique of integration, these functions may be integrated separately, or a part or all of them may be integrated into a single chip. Furthermore, if new technologies for integrated circuits appear to be replaced with the LSIs, it is, of course, possible to use such technologies to implement the functions as an integrated circuit.

In the above example, the decoding device according to the present invention is used in the digital broadcasting receiving device. However, the decoding device according to the present invention may be used in optical reproduction devices such as Blue-ray Disc players and DVD players, personal computers, and the like.

Thus, the decoding device according to the present invention has been described with reference to the above embodiments, but the present invention is not limited to the above.

More specifically, the above-described embodiments are merely examples and do not limit the present invention. The scope of the present invention is indicated not by the above description, but by the claims of the present invention. The present invention includes any modifications within the meaning and scope of the claims. It is also possible to desirably combine the features in the above embodiments without materially departing from the novel teachings and advantages of the present invention.

The decoding device according to the present invention enables digital broadcasting receiving devices, mobile phones, optical reproduction devices such as Blu-ray Disc players and DVD players, personal computers, and the like to perform decoding processes efficiently.

NUMERICAL REFERENCES 10 decoding device
11 first region decoding unit
12 second region decoding unit
13 third region decoding unit
101 luminance decoder
102 chrominance decoder
103 luminance memory
104 chrominance memory
105 synthesis unit
201 stream separation unit
202, 212, 222 luminance image reconstruction unit
203, 213, 223 chrominance image reconstruction unit
204 luminance memory
205 chrominance memory
206, 207 resulting-image synthesis unit
250 region dividing unit
251 first region dividing unit
252 second region dividing unit
260 resulting-image-region synthesis unit
301 variable length decoding unit
302 separation unit
501 general MPEG-2 decoder
502 variable length decoding unit 503 inverse quantization unit
504 inverse transformation unit
505 motion compensation unit
506 memory
601 inverse quantization unit
602 inverse transformation unit
603 motion compensation unit
801 stream separation unit
802 chrominance image reconstruction unit
901 parameter calculation unit
1401 stream separation unit
1402, 1403, 1404 image reconstruction unit
1405, 1406, 1407 memory
1408 resulting-image synthesis unit
1501 control unit
1502 separation unit
1601 configuration change unit
1602 inverse quantization unit
1603 inverse transformation unit
1604 motion compensation unit
1901 receiving device
1902 tuner module
1903 stream decoder
1904 audio decoder
1905 ROM
1906 CPU
1907 RAM
1908 output control unit
1909 decoding device

The invention claimed is:

1. A decoding device that decodes coded image data having a plurality of color components, the decoding device comprising:
a variable length decoding unit configured to perform variable length decoding on the coded image data to generate variable length decoded data;
a separation unit configured to, after the variable length decoding unit generates the variable length decoded data, (i) separate the plurality of color components into a number of color components, and (ii) obtain, from the variable length decoded data generated by the variable length decoding unit, pieces of data to be decoded in decoding processes as necessary data, each of the pieces of data being required in at least one of decoding processes, and each of the decoding processes corresponding to a corresponding component of the number of color components;
image reconstruction units, each of the image reconstruction units corresponding to a corresponding component of the number of color components, and configured to generate a decoded image regarding the corresponding component using the necessary data obtained by the separation unit, the image reconstruction units performing the generation in parallel; and
a control unit configured to decide a separation method of separating the plurality of color components to the number of color components, based on a chrominance format of the coded image data,
wherein the separation unit is configured to (i) separate the plurality of color components to the number of color components according to the separation method decided by the control unit, and (ii) obtain the necessary data required in each of the decoding processes, and
each of the image reconstruction units is configured to generate a decoded image regarding the corresponding component, according to the separation method decided by the control unit.

2. The decoding device according to claim 1, further comprising:
a parameter calculation unit configured to perform common processing using the variable length decoded data generated by the variable length decoding unit so as to generate common processed data, when each of at least two decoding processes among the decoding processes needs the common processing to generate the common processed data,
wherein the separation unit is further configured to obtain, from the common processed data, pieces of data to be decoded as the necessary data, each of the pieces of data being required in one of the at least two decoding processes, and
at least two of the image reconstruction units, each of the at least two of the image reconstruction units corresponding to a corresponding component of the number of color components for which the common processing is necessary in the corresponding decoding process, configured to generate the decoded image regarding the corresponding component, using the necessary data obtained by the separation unit.

3. The decoding device according to claim 2,
wherein the parameter calculation unit is configured to generate second data and third data, when (i) a first decoding process among the decoding processes needs the second data that is generated from a first data to be decoded in the first decoding process and (ii) a second decoding process among the decoding processes needs the third data that is generated from the second data after the second data is generated from the first data, the first decoding process corresponding to a first color component of the number of color components, and the second decoding process corresponding to a second color component of the number of color components,
the separation unit is configured to obtain the second data as the necessary data required in the first decoding process, and the third data as the necessary data required in the second decoding process,
one of the image reconstruction units, which corresponds to the first color component, is configured to generate a decoded image regarding the first color component using the second data, and
one of the image reconstruction units, which corresponds to the second color component, is configured to generate a decoded image regarding the second color component using the third data.

4. The decoding device according to claim 1,
wherein the control unit is configured to decide the separation method by which a fourth color component is separated into color components that are more than a third color component, when a number of pixels regarding the fourth color component is larger than a number of pixels regarding the third color component in the plurality of color components of the coded image data.

5. The decoding device according to claim 1,
wherein each of the image reconstruction units includes
a configuration change unit configured to (i) obtain, from the control unit, information that indicates, among the number of color features, a color component of the necessary data which is provided to the each of the image reconstruction units, and (ii) output an instruction signal to instruct the each of the image reconstruction units to generate a decoded image regarding the color component indicated in the information using the necessary data.

6. The decoding device according to claim 1, further comprising:
  a resulting-image synthesis unit configured to generate a resulting decoded image of the coded image data, by synthesizing the decoded images generated by the image reconstruction units,
  wherein the resulting-image synthesis unit is configured to generate the resulting decoded image according to the separation method decided by the control unit.

7. The decoding device according to claim 1, further comprising:
  a region dividing unit configured to divide a region of the coded image data into a plurality of regions;
  a plurality of variable length decoding units including the variable length decoding unit, the variable length decoding units each corresponding to a part of the coded image data, and the part corresponding to a corresponding one of the plurality of regions;
  a plurality of separation units including the separation unit, the separation units each corresponding to a corresponding one of the variable length decoding units;
  a plurality of image reconstruction units including the image reconstruction units, the plurality of image reconstruction units each corresponding to a corresponding one of the separation units; and
  a resulting-image-region synthesis unit configured to generate a resulting decoded image of the coded image data, by synthesizing the decoded images generated by the plurality of image reconstruction units.

8. The decoding device according to claim 1, further comprising:
  a plurality of region dividing units each configured to divide a region regarding a corresponding color component of the number of color components into a plurality of regions, the region being of the coded image data, and the number of color components being separated from the plurality of color components by the separation unit; and
  a plurality of image reconstruction units including the image reconstruction units, the plurality of image reconstruction units each corresponding to a corresponding one of the plurality of regions each of which corresponds to one of the number of color components.

9. A decoding method of decoding coded image data having a plurality of color components, the decoding method comprising:
  performing variable length decoding on the coded image data to generate variable length decoded data;
  after the variable length decoding unit generates the variable length decoded data, (i) separating the plurality of color components into a number of color components, and (ii) obtaining, from the variable length decoded data generated in the performing of variable length decoding, pieces of data to be decoded in decoding processes as necessary data, each of the pieces of data being required in at least one of decoding processes, and each of the decoding processes corresponding to a corresponding component of the number of color components;
  generating, in parallel, decoded images each of which is regarding the corresponding component using the necessary data obtained in the separating regarding the corresponding component; and
  deciding a separation method of separating the plurality of color components to the number of color components, based on a chrominance format of the coded image data,
  wherein the separating of the plurality of color components (i) separates the plurality of color components to the number of color components according to the separation method decided by the control unit, and (ii) obtains the necessary data required in each of the decoding processes, and
  in the generating of the decoded images, a decoded image is generated regarding the corresponding component, according to the separation method decided.

10. An integration circuit that controls a decoding device which decodes coded image data having a plurality of color components, the integration circuit comprising:
  a variable length decoding unit configured to perform variable length decoding on the coded image data to generate variable length decoded data;
  a separation unit configured to, after the variable length decoding unit generates the variable length decoded data, (i) separate the plurality of color components into a number of color components, and (ii) obtain, from the variable length decoded data generated by the variable length decoding unit, pieces of data to be decoded in decoding processes as necessary data, each of the pieces of data being required in at least one of decoding processes, and each of the decoding processes corresponding to a corresponding component of the number of color components;
  image reconstruction units each of the image reconstruction units corresponding to a corresponding component of the number of color components, and is configured to generate a decoded image regarding the corresponding component using the necessary data obtained by the separation unit, the image reconstruction units performing the generation in parallel; and
  a control unit configured to decide a separation method of separating the plurality of color components to the number of color components, based on a chrominance format of the coded image data,
  wherein the separation unit is configured to (i) separate the plurality of color components to the number of color components according to the separation method decided by the control unit, and (ii) obtain the necessary data required in each of the decoding processes, and
  each of the image reconstruction units is configured to generate a decoded image regarding the corresponding component, according to the separation method decided by the control unit.

11. A receiving device receiving a broadcast stream, the receiving device comprising:
  a data separation unit configured to separate, from the broadcast stream, coded image data which is coded video data having a plurality of color components;
  the integrated circuit according to claim 10 which decodes the coded image data separated by the data separation unit so as to generate the decoded images; and
  an output control unit configured to output video signals generated from the decoded images generated by the integrated circuit as video signals.

12. A non-transitory computer-readable recording medium storing a program for decoding coded image data having a plurality of color components, the program causing a computer to execute steps comprising:
  performing variable length decoding on the coded image data to generate variable length decoded data;
  after the variable length decoding unit generates the variable length decoded data, (i) separating the plurality of color components into a number of color components, and (ii) obtaining, from the variable length decoded data generated in the performing of variable length decoding, pieces of data to be decoded in decoding processes as necessary data, each of the pieces of data being required in at least one of decoding processes, and each of the decoding processes corresponding to a corresponding component of the number of color components;

generating, in parallel, decoded images each of which is regarding the corresponding component using the necessary data obtained in the separating regarding the corresponding component;

generating a resulting decoded image of the coded image data, by synthesizing the decoded images generated by the generating of decoded images; and deciding a separation method of separating the plurality of color components to the number of color components, based on a chrominance format of the coded image data, wherein the separating of the plurality of color components (i) separates the plurality of color components to the number of color components according to the separation method decided by the control unit, and (ii) obtains the necessary data required in each of the decoding processes, and in the generating of the decoded images, a decoded image is generated regarding the corresponding component, according to the separation method decided.

* * * * *